(12) United States Patent
Putnam, Jr.

(10) Patent No.: US 11,866,116 B2
(45) Date of Patent: Jan. 9, 2024

(54) MULTI-AXIS GIMBALED CONTAINER

(71) Applicant: John Edson Putnam, Jr., Boulder, CO (US)

(72) Inventor: John Edson Putnam, Jr., Boulder, CO (US)

(*) Notice: Subject to any disclaimer, the term of this patent is extended or adjusted under 35 U.S.C. 154(b) by 9 days.

(21) Appl. No.: 17/475,120

(22) Filed: Sep. 14, 2021

(65) Prior Publication Data

US 2022/0081053 A1 Mar. 17, 2022

Related U.S. Application Data

(60) Provisional application No. 63/077,865, filed on Sep. 14, 2020.

(51) Int. Cl.
| | |
|---|---|
| *B62J 9/27* | (2020.01) |
| *B60R 7/04* | (2006.01) |
| *B62J 9/23* | (2020.01) |
| *B62J 9/28* | (2020.01) |

(52) U.S. Cl.
CPC .............. *B62J 9/27* (2020.02); *B60R 7/043* (2013.01); *B62J 9/23* (2020.02); *B62J 9/28* (2020.02)

(58) Field of Classification Search
CPC ......... B62J 7/04; B62J 9/28; A47G 2400/086; F16F 15/173
USPC .............................. 248/583; 74/5.5; 188/290
See application file for complete search history.

(56) References Cited

U.S. PATENT DOCUMENTS

| | | | | |
|---|---|---|---|---|
| 1,842,198 A | * | 1/1932 | Price .................. | H02K 5/24 248/581 |
| 3,840,204 A | * | 10/1974 | Thomas ............... | B63B 29/12 224/406 |
| 4,191,350 A | * | 3/1980 | Ormond ............... | A01K 97/04 248/311.2 |
| 4,248,397 A | * | 2/1981 | Casper ............... | A47G 23/0216 248/311.2 |
| 4,270,393 A | * | 6/1981 | Osborne .............. | G01C 19/16 248/583 |
| 4,819,843 A | * | 4/1989 | Nakayama ........... | B60N 3/103 220/737 |
| 4,826,058 A | * | 5/1989 | Nakayama ........... | B60N 3/102 224/281 |
| 4,972,982 A | * | 11/1990 | Harbour .............. | B44D 3/14 224/617 |
| 5,645,262 A | * | 7/1997 | Hamlin ............... | G11B 33/08 248/610 |
| 6,536,724 B2 | * | 3/2003 | Furuta ................ | F16M 11/123 248/583 |

(Continued)

FOREIGN PATENT DOCUMENTS

| | | | | |
|---|---|---|---|---|
| DE | 102014223048 B4 | * | 8/2022 | ............... B62J 7/04 |
| EP | 3560806 A1 | * | 10/2019 | ............... B62J 7/04 |

(Continued)

*Primary Examiner* — Justin M Larson
(74) *Attorney, Agent, or Firm* — Dorsey & Whitney LLP

(57) ABSTRACT

A container assembly for coupling to a vehicle. The container assembly includes a container rotatably connected to a support structure to rotate relative to the support structure about a first axis by a mounting assembly. A connecting assembly is operably rotatably connected between the container and the support about a second axis. The center of mass of the container is located below the first axis and the second axis.

24 Claims, 25 Drawing Sheets

(56) References Cited

U.S. PATENT DOCUMENTS

| | | | | |
|---|---|---|---|---|
| 7,114,689 B2* | 10/2006 | Anderson, II | ............ | D21F 1/34 |
| | | | | 248/278.1 |
| 8,016,254 B2* | 9/2011 | Tschaggeny | ............ | G01C 19/08 |
| | | | | 248/278.1 |
| 8,348,084 B2* | 1/2013 | Dahlquist | .............. | A47G 19/02 |
| | | | | 220/574 |
| 8,789,801 B2* | 7/2014 | Newman | ................... | B62B 1/24 |
| | | | | 248/661 |
| 10,368,671 B2 | 8/2019 | Berg | | |
| 10,988,196 B2* | 4/2021 | Reinhart | .................... | B62J 7/04 |
| 11,059,536 B2* | 7/2021 | Yoshida | .................... | B62J 9/28 |
| 2003/0197104 A1* | 10/2003 | Heybl | .................... | B60N 3/108 |
| | | | | 248/314 |
| 2008/0099488 A1* | 5/2008 | Dahlquist | .............. | A47G 19/02 |
| | | | | 220/574 |
| 2009/0078714 A1* | 3/2009 | Peacock | .................. | B60N 3/10 |
| | | | | 220/703 |
| 2016/0137384 A1* | 5/2016 | Buelna | .................. | B65D 81/07 |
| | | | | 206/583 |
| 2019/0118890 A1 | 4/2019 | Reinhart | | |
| 2021/0386230 A1* | 12/2021 | Vollers, III | .......... | F16M 11/123 |
| 2022/0081053 A1* | 3/2022 | Putnam | ...................... | B62J 9/27 |

FOREIGN PATENT DOCUMENTS

| | | | | |
|---|---|---|---|---|
| JP | 2002347683 A | | 12/2002 | |
| KR | 200332145 Y1 | | 11/2003 | |
| KR | 20060096396 A | * | 9/2006 | |
| KR | 200432642 Y1 | | 12/2006 | |
| WO | 2019202308 A1 | | 10/2019 | |
| WO | WO-2021074638 A1 | * | 4/2021 | ......... A47G 23/0208 |

* cited by examiner

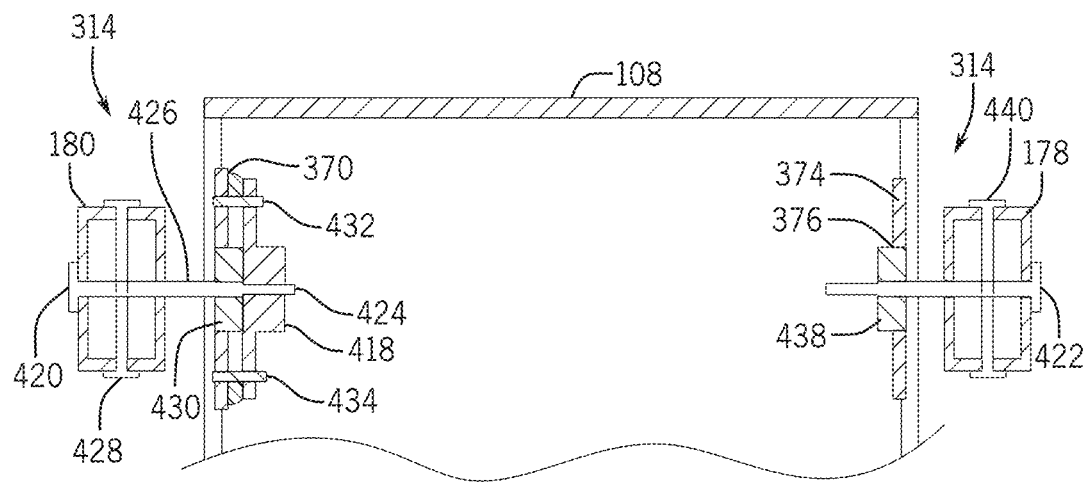
FIG. 15A
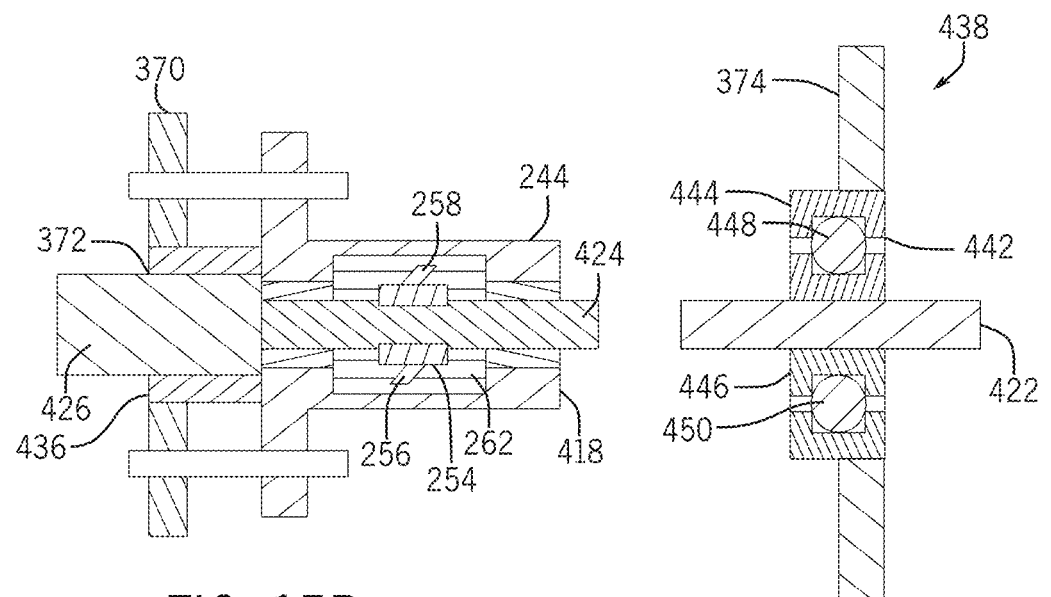
FIG. 15B
FIG. 15C

MULTI-AXIS GIMBALED CONTAINER

CROSS-REFERENCE TO RELATED APPLICATION

The present application claims priority under 35 U.S.C. § 119 to U.S. Provisional Application No. 63/077,865 entitled "Multi-Axis Gimbaled Container," filed on Sep. 14, 2020, which is hereby incorporated by reference herein in its entirety.

FIELD

The present disclosure relates generally to containers to reduce shifting of items during transport, such as when transporting food on a bicycle.

BACKGROUND

Bicycles, motorcycles, automobiles, and other types of vehicles are frequently used to deliver items, such as food, to consumers. Often, the items to be delivered as not held in a specialized restraint or container (e.g., merely placed on the floor or seat of the vehicle) or may be positioned within a unsecured container (e.g., insulated bag). As such, movement and other changes during transport, such as turns, increases/decreases in acceleration, impact, and the like, may impact the items to be delivered. Food and drinks may be especially sensitive to changes in orientation and momentum during transportation, causing breakage, spillage, leakage, or other shifts during travel.

SUMMARY

An example gimbaled container includes a container rotatably connected to a support structure to rotate relative to the support structure about a first axis by a mounting assembly. A connecting assembly is operably rotatably connected between the container and the support about a second axis. A center of mass of the container is located below the first axis and the second axis.

An example gimbal assembly includes a gimbal frame mounted on a vehicle, where the gimbal frame includes a fixed support mounted on the body and a movable support rotatably mounted to the fixed support and rotatable about a first axis of rotation. A container defining an internal chamber is mounted to the gimbal frame and is rotatable about the first axis of rotation and a second axis of rotation. The container defines a neutral orientation when the vehicle is not motionless, and the gimbal frame movable supports the container to substantially maintain the neutral orientation responsive to changes in an orientation of the vehicle. The gimbal frame is movable to support the container to rotate responsive to changes in momentum of the vehicle to maintain a position of contents of the container within the container.

An example container assembly includes a housing defining an enclosure, a mounting assembly coupled to the housing and configured to movably couple the housing to a support structure. The mounting assembly allows rotation about a first axis. The container assembly further includes a connecting assembly coupled to the housing and the support structure, where the connecting assembly allows rotation about a second axis.

Additional embodiments and features are set forth in part in the description that follows, and will become apparent to those skilled in the art upon examination of the specification and may be learned by the practice of the disclosed subject matter. A further understanding of the nature and advantages of the present disclosure may be realized by reference to the remaining portions of the specification and the drawings, which form a part of this disclosure. One of skill in the art will understand that each of the various aspects and features of the disclosure may advantageously be used separately in some instances, or in combination with other aspects and features of the disclosure in other instances.

BRIEF DESCRIPTION OF THE DRAWINGS

The description will be more fully understood with reference to the following figures in which components are not drawn to scale, which are presented as various examples of the present disclosure and should not be construed as a complete recitation of the scope of the disclosure, characterized in that:

FIG. 15A illustrates a section view of a gimbaled container, taken along line 14-14 of FIG. 13.

FIG. 15B illustrates an example mounting assembly for a gimbaled container.

FIG. 15C illustrates an example mounting assembly for a gimbaled container.

DETAILED DESCRIPTION

Figure 1:
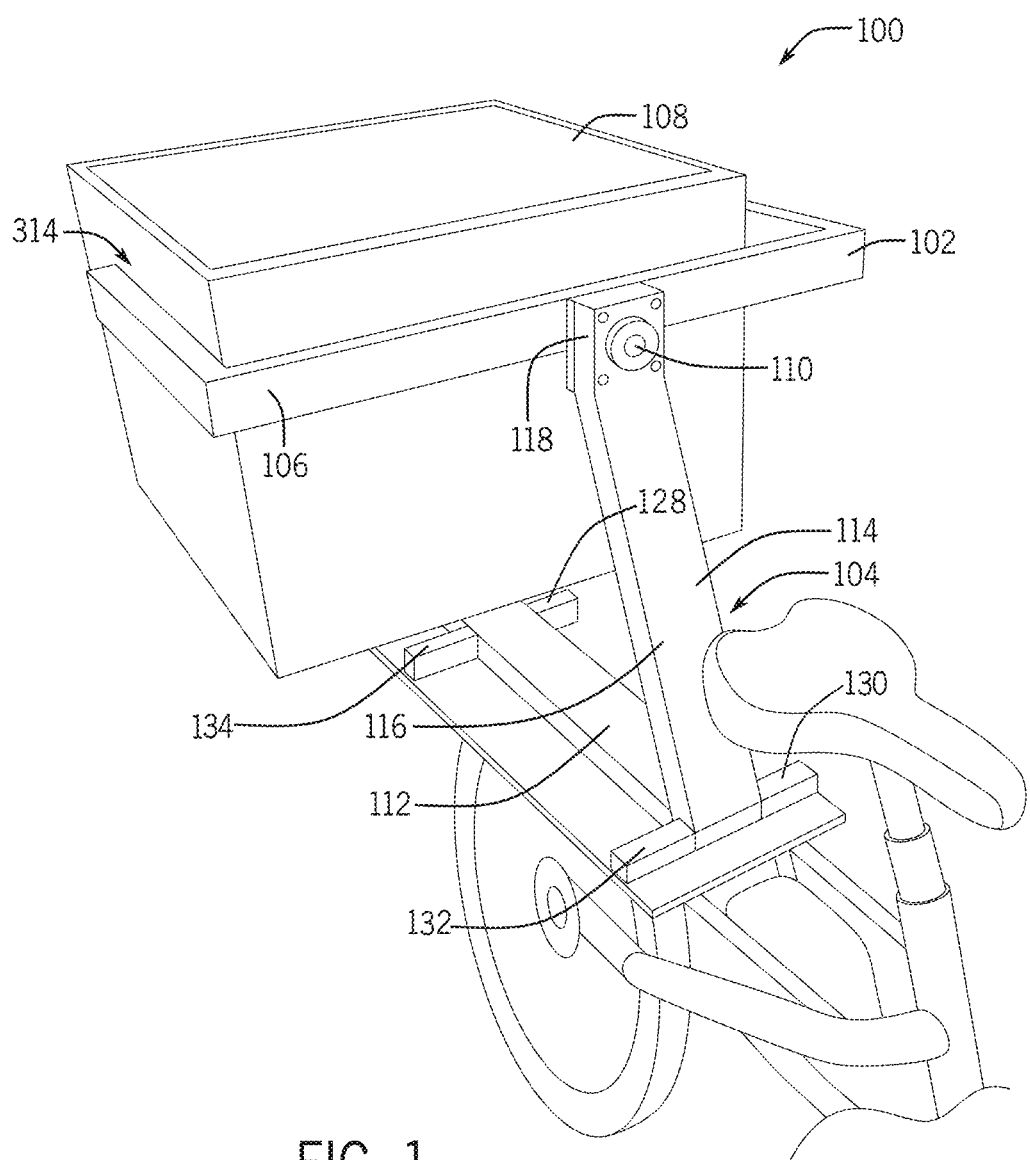
FIG. 1 illustrates an example gimbaled container mounted to a bicycle.

The present application includes embodiments for a container assembly including a container or housing that can counteract or mitigate forces, such as turning forces, acceleration, and declaration forces, that may be applied to the container, such as during transport. In one example, a container may be used in combination with a vehicle or other movable element to deliver delicate or easily damaged items, such as food and beverages. The container assembly may be a gimbal assembly (e.g., a gimbaled container), where the container or housing is supported by a pivoted support allowing the container or housing to maintain an upright position even as the vehicle is in motion. The examples of a gimbaled container described herein may provide for motion control along at least two axes, such that a container holding food can rotate to maintain or substantially maintain an upright position that mitigates the effect of the vehicle tilting while going around curves or traveling up or down steep hills. In many instances, the container may be configured to generate counter forces to help stabilize the container and/or help to dampen any forces experienced by the container or its contents. The gimbaled container may rotate responsive to linear or angular accelerations of the vehicle, such as accelerating, turning, or stopping by rotating such that the contents of the container experience a resultant force downward with respect to the bottom surface of the container that keeps the contents in place relative to the container. Accordingly, the gimbaled container compensates for forces from the vehicle, reducing spillage, slippage, or damage to contents of the container, The gimbaled container allows rotation about at least two axes, and may include axles or other pivot points about each axis or a pivot point capable of allowing rotation about two or more axes (e.g., a ball joint 710 shown in FIG. 23). A container is generally positioned relative to the pivot points such that weight from the contents of the container is positioned below the pivot point, allowing the contents to be impacted by rotational dynamics transferred or applied from torque exerted by the object to which the gimbaled device is attached (e.g., a vehicle). As a result, the center of force acting on the container and the contents of the container is directed to the bottom of the container, keeping the contents of the container from spilling, shifting, or being otherwise damaged. The gimbaled container may, in various examples, be attached to a bicycle, motorcycle, utility vehicle, or the like. The gimbaled container may also be mounted within a cab of a vehicle, such as a car, or on the outside of a vehicle, such as in the bed of a truck.

The gimbaled container may also include at least one rotational damper for each axis of rotation, or a rotational damper on one of the two axes of rotation to mitigate forces transferred from the gimbaled container to the vehicle. For example, when a vehicle, such as a bicycle, motorcycle, moped, or the like, transporting the gimbaled container makes a sudden, sharp maneuver such as a stop or turn, the damper or dampers oppose rotational motion of the container, which limits the magnitude that the container rotates about either or both axes of rotation. The rotational damper or dampers may be selected to apply a rotary damping force capable of mitigating rotational inertia while having a minimal impact on the rotational dynamics of the gimbaled container.

FIG. 1 illustrates an example gimbaled container 100 mounted to a bicycle. A gimbaled container 100 may provide for motion control along at least two axes. A support 102, including a fixed support 104 and a movable support 106 may attach a container 108 to a vehicle. A vehicle may include a movable structure powered by human effort, an engine, motor, or other external force or internal force, including a push-cart, a bicycle (electric or human powered), an automobile, airplane, train, scooter, motorcycle, boat, personal watercraft, snowmobile, snow track machine, etc.

A connecting assembly 110 connecting the fixed support 104 to the movable support 106 may allow rotation of the movable support 106 about a first axis (e.g., axis 5 shown in FIG. 2) relative to the fixed support 104. Accordingly, when the fixed support 104 is mounted, attached, or otherwise fixed to a vehicle, the fixed support 104 may sway or rotate with the vehicle or responsive to forces exerted on the fixed support 104 by movement of the vehicle while the movable support 106 maintains its neutral position relative to the fixed support 104, where the neutral position of the movable support 106 is the position of the movable support 106 when the vehicle is not in motion and is resting on a flat, horizontal surface. Mounting assemblies 314 may mount the movable support 106 to the container 108 and may allow rotation of the container 108 about a second axis (e.g., axis 7 shown in FIG. 2) relative to the fixed support 104. Accordingly, the container 108 may maintain its neutral or upright position relative to the fixed support 104 and the movable support 106 as motion of the vehicle exerts various forces on the gimbaled container 100.

In some implementations, the connecting assembly 110 and either or both of the mounting assemblies 314 may include rotational dampers. The connecting assembly 110 may act to dampen rotation of the container 108 about the first axis 5 and the mounting assemblies 314 may act to dampen the rotation of the container 108 about the second axis 7. The damping provided by the connecting assembly 110 and either or both of the mounting assemblies 314 may mitigate the effects of any "swing" of the container 108 resulting from sharp movements of the vehicle. For example, when a vehicle moving forward stops suddenly, rotational inertia may cause the container 108 to swing about the second axis 7 after the vehicle has stopped in a pendulum like manner until the container 108 is slowed by some other force. Because the vehicle has stopped, there are few forces to counteract the swing of the container 108 relative to the vehicle. Introducing rotational dampers into the system provides a force to counteract the swinging of the container 108. The rotational dampers also smoothly oppose the swinging of the container 108 such that the contents of the container are not subject to sharp jolts that may cause spillage.

Figure 2:
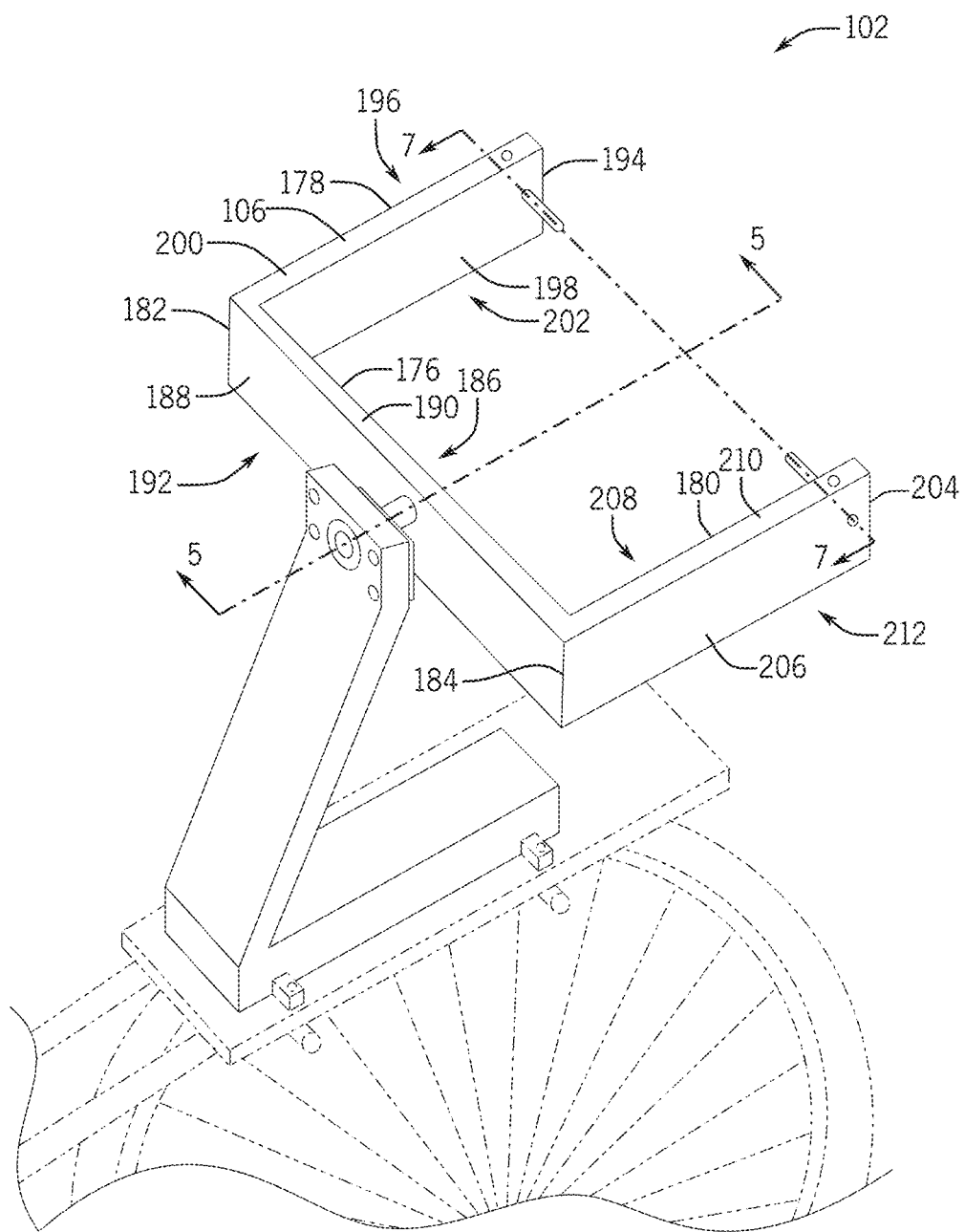
FIG. 2 illustrates a perspective view of an example support for a gimbaled container.

With reference to FIG. 2, the support 102 may include the fixed support 104 and the movable support 106 connected by the connecting assembly 110. The fixed support 104 and the movable support 106 may be implemented using a variety of materials including aluminum, metal alloys, plastics (e.g., polyvinyl chloride (PVC)), wood, or other suitable rigid material. In the example gimbaled container shown in FIG. 1, the fixed support 104 and the movable support 106 are constructed from rectangular hollow aluminum members or tubes. In some implementations, the fixed support 104 and the movable support 106 may be constructed from different materials, or have different structures. For example, the fixed support 104 may be constructed from hollow aluminum members and the movable support 106 may be constructed from hollow circular PVC tubes.

Figure 3:
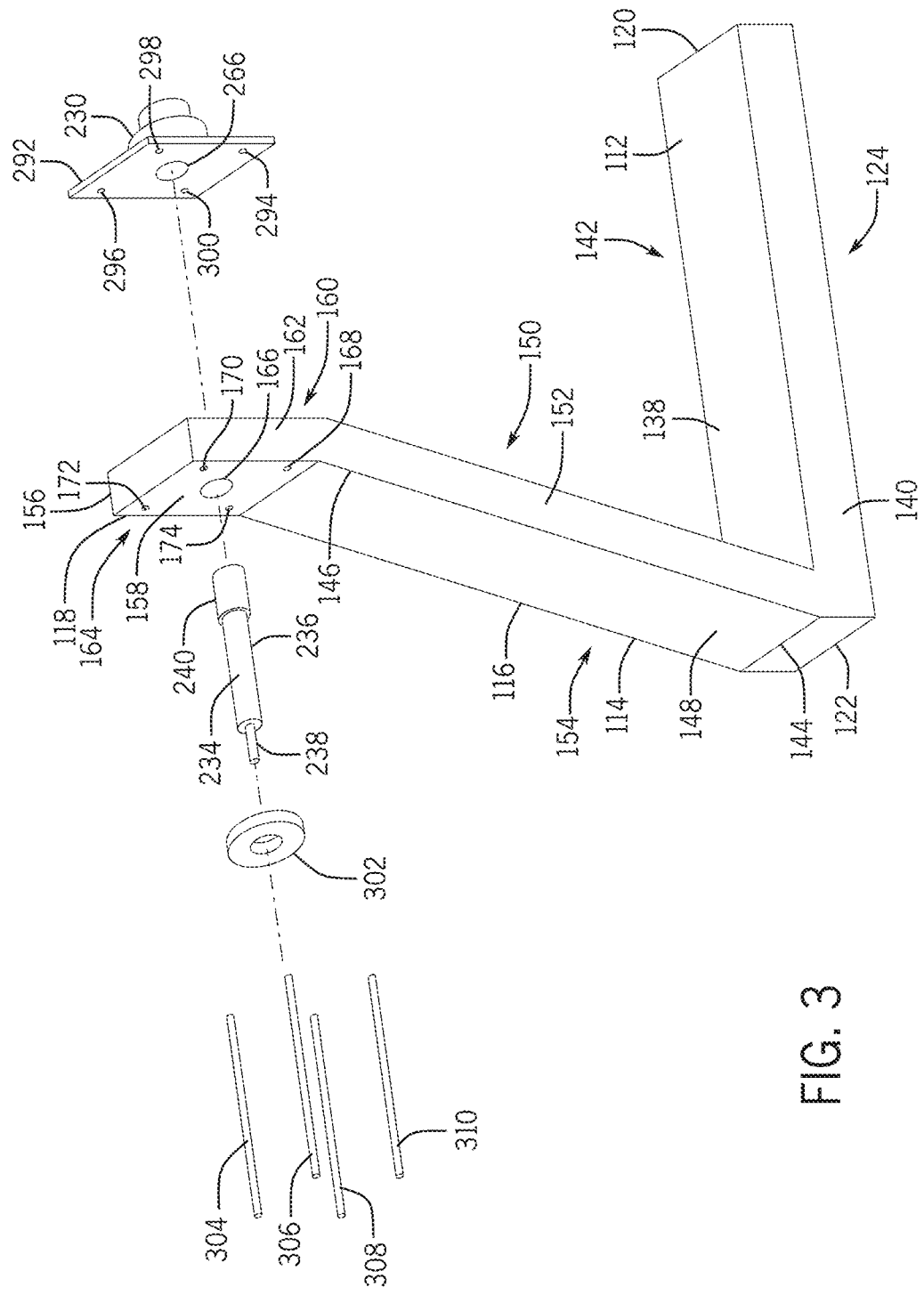
FIG. 3 is an exploded view of a rotational damper and fixed support for a gimbaled container.

With reference to FIG. 3, one implementation of the fixed support 104 includes a base portion 112 and a post portion 114 extending upwardly from the base 112. The post 114 may include a first portion 116 and a second portion 118. The first portion 116 may attach at one end to the base 112 and extend upwardly at an angle less than 90 degrees with the base 112. The second portion 118 may attach to the first portion 116 and extend upwardly therefrom, such as to form a 90 degree angle with the base 112. The base 112 shown in FIG. 3 has a constant rectangular cross-section extending from a first end portion 120 to a second end portion 122, defining a rectangular prism with parallel opposing surfaces 124 and 138 perpendicular to parallel opposing surfaces 140 and 142. The rectangular cross-section generally has a larger width (measured along the first end portion 120 and/or the second end portion 122) than height, such that the base 112 creates a stable support for the gimbaled container 100.

In some implementations, the base 112 may have a variable cross-section. For example, the cross-section at the first end portion 120 may be a larger rectangle (either in terms of width or height) than the cross section at the second end portion 122 of the base. Further, in some implementations, the base 112 may have a cross-section that is not rectangular, such as a semi-circle, trapezoid, or other regular or irregular polygons. Generally, the cross-section of the base 112 is chosen to create a flat bottom surface 124, though in some implementations, the surface 124 may be curved or otherwise shaped to accommodate attachment of the gimbaled container 100 to different types of vehicles.

As shown in FIG. 1, in some implementations, the base 112 may include attachment features to attach the gimbaled container 100 to a vehicle, such as a bicycle. The attachment features include anchor bars 128, 130, 132, 134 and an attachment plate 136. The anchor bars 128, 130, 132, and 134 may extend from surfaces 140 and 142 of the base 112 to facilitate a stable connection to the attachment plate 136. Other types of attachment features, such as clips or brackets may also be included in or attached to the base 112 in various implementations.

Returning to FIG. 3, the post 114 of the fixed support extends upward from adjacent an end portion 122 of the base 112, and extends at an acute angle to the surface 138 of the base 112. The post 114 may, in some implementations, be implemented by a member or members extending at different angles, such as perpendicular from the surface 138 of the base 112. In other embodiments, such as the fixed support 104 shown in FIG. 3, the post 114 includes an angled portion 116 and an upright portion 118. The angled portion 116 may, as shown, have a constant rectangular cross-section extending from a first end portion 144 to an end portion 146 defining a rectangular prism with parallel opposing surfaces 148 and 150 perpendicular to parallel opposing surfaces 152 and 154. The rectangular cross-section generally has a larger width (measured along the first end portion 144 and/or the end portion 146) than height. The first end portion 144 may have the same width as the second end portion 122 of the base 112 or may be, in some implementations, shorter than the second end portion 122 of the base 112. In some implementations, the angled portion 116 may have a variable cross-section, such that the cross-section at the end portion 146 may be a smaller rectangle (either in terms of width or height) than the cross-section at the first end portion 144. Further, in some implementations, the angled portion 116 may have a cross-section that is not rectangular, such as a semi-circle, trapezoid, or other regular or irregular polygon.

The angled portion 116 of the post 114 may be angled to create an angle of less than 90° between the surface 150 of the angled portion 116 and the surface 138 of the base 112. For example, in one implementation, the angled portion 116 is tilted 20° from an upright position, such that the angle between the surface 150 of the angled portion 116 and the surface 138 of the base 112 is 70°. This angle between the base 112 and the angled portion 116 may provide for increased range of motion (doesn't interfere with rider's motions) for a rider on a bicycle when the gimbaled container 100 is mounted on a bicycle, as shown in FIG. 1. Angles of the angled portion 116 may differ in various implementations.

The upright portion 118 of the post 114 may extend from adjacent the end portion 146 of the angled portion 116 to a second end portion 156. The upright portion 118 may be angled such that the surface 160 of the upright portion and the surface 138 of the base 112 are substantially perpendicular. In other implementations, the upright portion 118 may angled to form a different angle with the base 112, while remaining parallel to the movable support 106. The upright portion 118 of the post 114 may have a constant rectangular cross-section extending from the edge 146 to the second end portion 156, defining a rectangular prism with parallel opposing surfaces 158 and 160 perpendicular to parallel opposing surfaces 162 and 164.

With continued reference to FIG. 3, the fixed support 104 and the movable support 106 are connected using a connecting assembly 110. The connecting assembly 110 is positioned through an opening 166 formed through the upright portion 118, the opening 166 extending from the surface 158 through the surface 160. The opening 166 may be circular and may be located roughly at a center midpoint of the width of the upright portion 118 (such as for instance, substantially equidistant between the opposing lateral surfaces 162 and 164. The central opening 166 may be positioned along the length of the upright portion 118, including for example at a midpoint along the length of the upright portion 118, or closer to either of the end portions of the upright portion 118. A lower position of the opening 166 may facilitate a lower center of gravity of the container and its contents. A higher position of the opening may allow for use of a container having a larger height dimension. The diameter of the central opening 166 may vary between implementations based on, for example, dimensions of components used in the connecting assembly 110.

Figure 4:
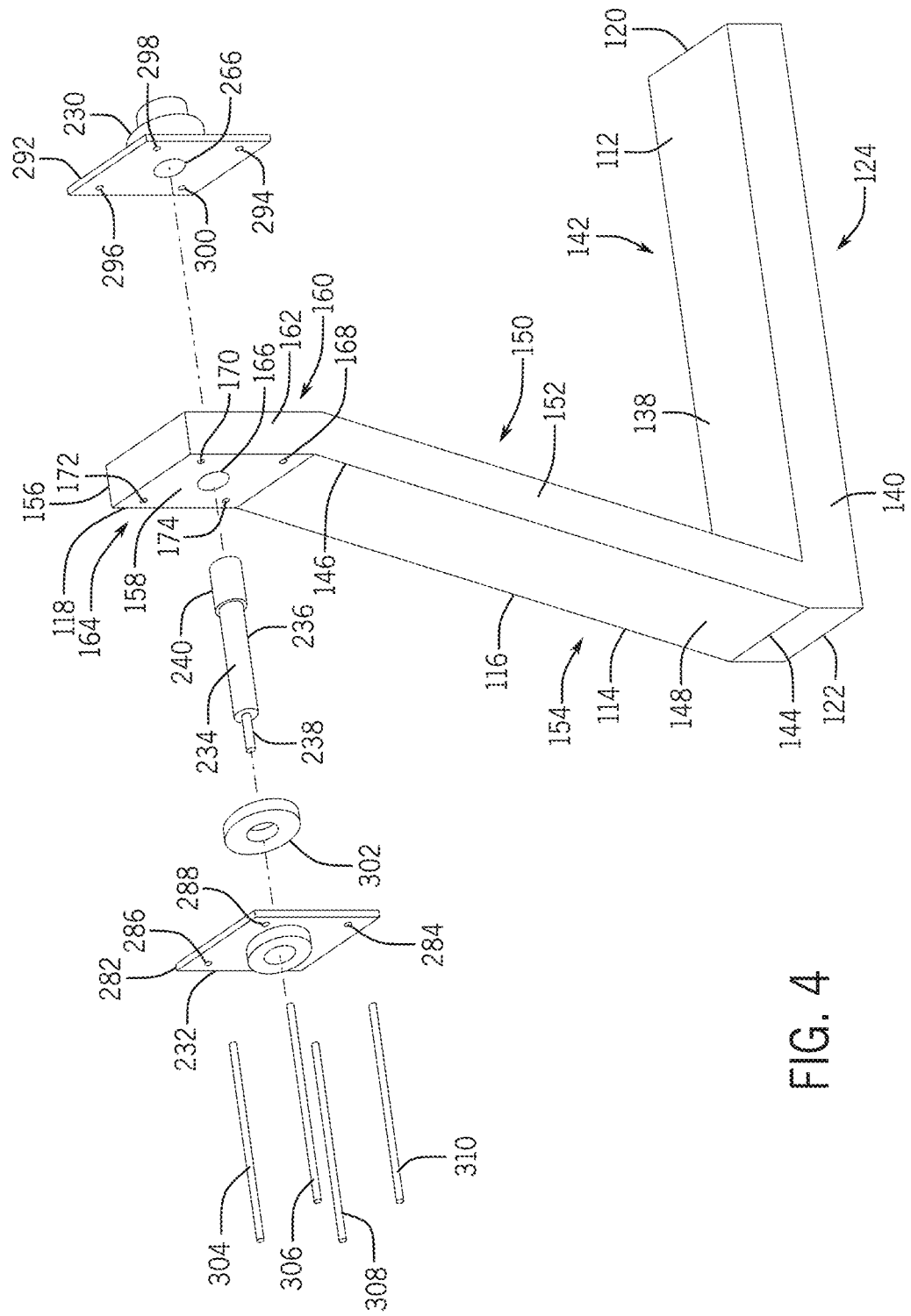
FIG. 4 is an exploded view of a rotational damper, bearing, and fixed support for a gimbaled container.

The connecting assembly 110 includes, in one example, bearings 230 and 302, which may be connected to the fixed support 104 by fasteners releasably secured in openings 168, 170, 172, and 174 extending from the surface 158 through the surface 160. The openings 168, 170, 172, and 174 shown in FIG. 3 are circular and positioned such that the openings 168, 170, 172, and 174 are located at the corners of a rectangle that are equidistant from the center of the opening 166. In other embodiments, the openings may be placed differently on the surface 158, and may be sized or shaped differently than the openings 168, 170, 172, and 174. Further, in various embodiments, the upright portion 118 may include more or fewer openings of varying sizes and shapes dependent upon, for example, components used in the connecting assembly 110. With reference to FIG. 4, in some implementations, the connecting assembly 110 includes a damper mechanism 232, which may be connected to the fixed support 104 by fasteners releasably secured in openings 168, 170, 172, and 174 extending from the surface 158 through the surface 160.

Figure 19A:
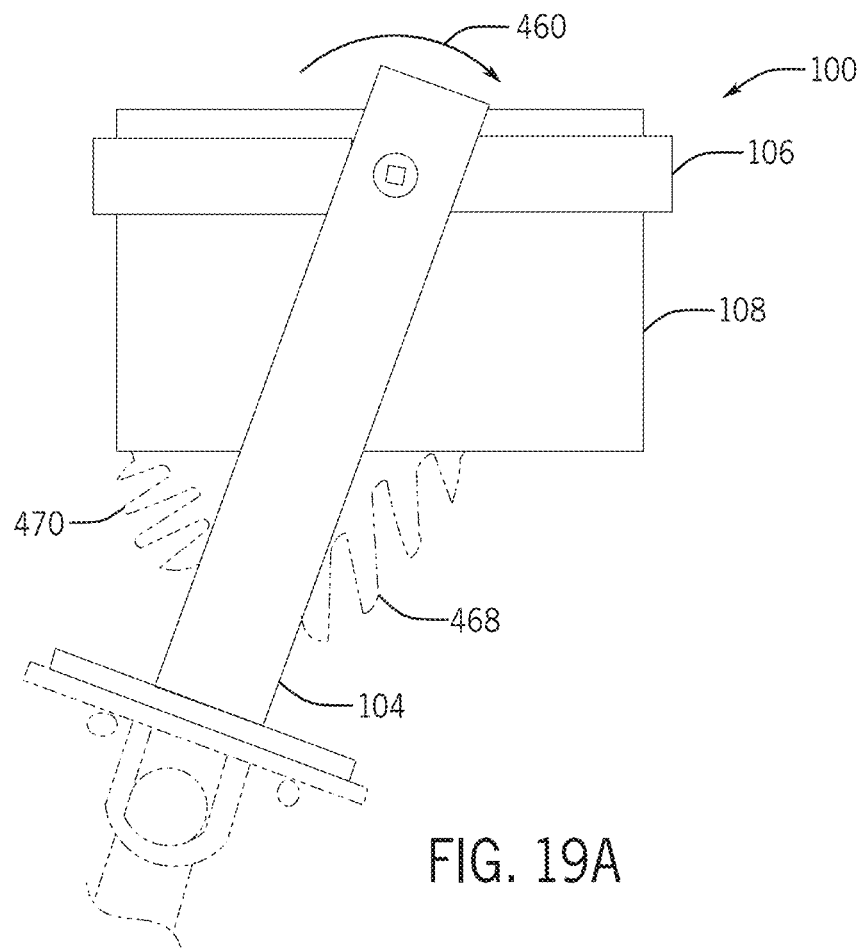
FIG. 19A illustrates an example gimbaled container during rotation along a first axis.

In some implementations, the gimbaled container 100 may include a damper mechanism external to the connecting assembly. For example, FIG. 19A shows, in broken lines, springs 470 and 468, which may be used to implement a damper mechanism with respect to rotation of the container 108 about the axis 5.

The fixed support 104 as shown in FIG. 3 is generally formed by welding the angled portion 116 to the base 112 such that the first end portion 144 of the post 114 meets the second end portion 122 of the base. The upright portion 118 is then welded to the angled portion 116 at the edge 146 to form the remainder of the post 114. In various implementations, the base 112, angled portion 116, and upright portion 118 may be joined using other methods (e.g., screws, nails, interference fits) as may be appropriate for materials used to form the fixed support 104. In some embodiments, the fixed support 104 may vary from the structure shown in FIG. 3. For example, the angled portion 116 may be attached to the base 112 at another location along the length of the base 112 such that the first end portion 144 of the post 114 does not meet the second end 122 portion of the base 112. The structure of the base 112 may vary (e.g., by the addition of one or more cross-members), including by adding additional bases to improve stability of the gimbaled container 100.

Further, in some implementations, the fixed support 104 may be implemented by other various structures securing a gimbaled container to a vehicle. For example, the gimbaled container 600 shown in FIG. 22 includes a fixed support 604 implemented by a member connecting a gimbaled container to headrests of a vehicle. In another example, the gimbaled container 700 shown in FIG. 23 includes a fixed support 704 implemented by a plate mounted to a roof of a vehicle.

With reference to FIG. 2, a movable support 106 is rotatably secured to the fixed support 104 by the connection assembly 110 to allow the movable support 106 to pivot about axis 5. The movable support 106 in turn rotatably supports the container 108 to pivot about axis 7. The movable support 106 may be formed by a cross-member 176 and arms 178 and 180, where the arms 178 and 180 each extend from the cross-member 176 at locations spaced apart along the length of the cross-member 176. In this example, the movable support 106 is generally U-shaped, with the cross-member 176 forming the base of the U, and each of the arms 178 and 180 extending from at or near respective opposing ends of the cross-member 176. In one example, the arms 178 and 180 and the cross-member 176 all lie generally in the same plane, where the cross-member 176 is rotatably attached to the fixed support 104 at a mid-point of the distance between the arms 178 and 180, such that the movable support 106 is balanced to rotate about the axis 5, as described in more detail below. The cross-member 176 and the arms 178 and 180 may each have a constant rectangular cross-section extending between first and second ends. For example, the cross-member 176 extends between a first end portion 182 and a second end portion 184, defining a rectangular prism with parallel opposing surfaces 186 and 188 perpendicular to parallel opposing surface 190 and 192. Arm 178 extends outward from the surface 186 of the cross-member to a distal end 194, defining a rectangular prism with parallel opposing surfaces 196 and 198 perpendicular to parallel opposing surfaces 200 and 202. Similarly, the arm 180 extends outward from the surface 186 of the cross-member 176 to a distal end 204, defining a rectangular prism with parallel opposing surfaces 206 and 208 perpendicular to parallel opposing surfaces 210 and 212. Each of the cross-member 176 and the arms 178 and 180 are generally oriented such that the height of the rectangular prisms (measured, for example as the distance between the surfaces 190 and 192 of the cross-member 176) is larger than the width (measured, for example, as the distance between the surfaces 186 and 188 of the cross-member 176). Further, as shown, the cross-member 176 and the arms 178 and 180 have the same cross-sectional dimensions. In various implementations, the cross-sections of the cross-member 176 and the arms 178 and 180 may be variable and may be shapes other than rectangular (e.g., circular, square, or other regular or irregular polygon).

Figure 5A:
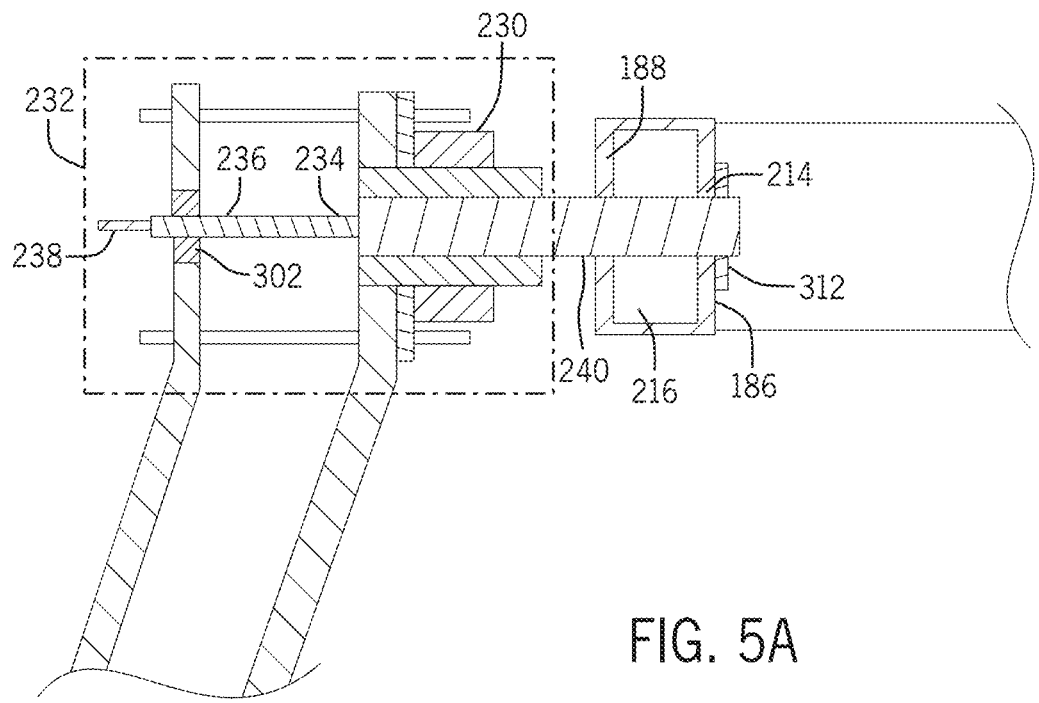
FIG. 5A is a section view of an example support for a gimbaled container, taken along line 5-5 of FIG. 2.

With reference to FIG. 5A, the cross-member 176 includes an opening 214 through the cross-member 176, such as for example through the surfaces 188 and 186. As shown in FIG. 5A, where the cross-member 176 is constructed as a hollow member, the opening 214 extends from the surface 188 to a hollow 216 in the cross-member 176 and through the surface 186. The opening 214 may be circular and located roughly equidistant between the end portions 182 and 184 of the cross-member and between the surfaces 190 and 192 of the cross-member 176. The hollow 216 in the cross-member 176 may extend along the entire length between the edges 182 and 184 and have the same or substantially similar cross section as the cross-member 176 such that walls formed between the surfaces 186, 188, 190, and 192 and the hollow 216 of the cross-member 176 are substantially the same thickness. For example, as shown in FIG. 5A, the cross-member 176 has a rectangular cross-section and the hollow 216 forms a rectangle. In some implementations, the rectangle formed by the hollow 216 may vary slightly from the rectangular cross-section of the cross-member 176 (e.g., either rectangle may have rounded corners).

Figure 7:
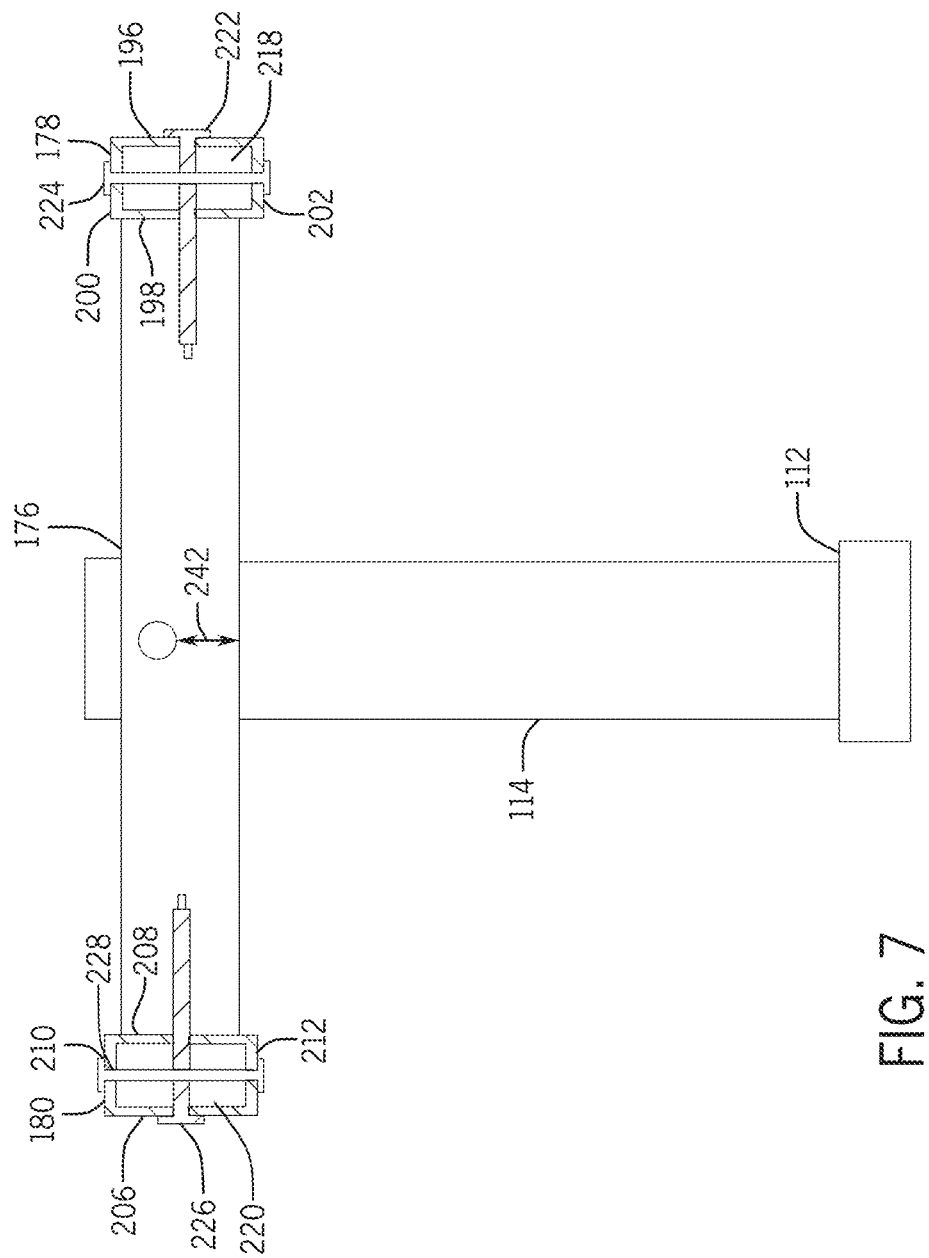
FIG. 7 is a section view of an example support for a gimbaled container, taken along line 7-7 of FIG. 2.

With reference to FIG. 7, the arms 178 and 180 may each define hollows 218 and 220, respectively, defined by the walls of the arms 178 and 180, the hollows extending along at least a portion of the length of the respective arms. The walls of the arms 178 and 180 may be substantially the same thickness along their respective lengths.

With reference to FIG. 1, the container 108 is rotatably mounted between the arms 178 and 180. A mounting assembly 314 connects each arm to the container 108, the mounting assemblies 314 allowing the container 108 to pivot about axis 7 with respect to the movable support 106. Returning to FIG. 7, apertures formed in each of the arms 178 and 180 may be used to receive, for example, mounting pins of the mounting assemblies 314. The mounting assemblies 314 are discussed further below. The arm 178 includes an opening or aperture 222 extending laterally through the arm 178, from the surface 196 through the surface 198. The opening 222 may be circular and may be located substantially equidistant from the bottom surface 202 and the upper surface 200 of the arm 178. The arm 178 also includes an opening 224 extending vertically through the arm 178, the aperture 224 extending from the upper surface 200 through the lower surface 202 of the arm 178. The opening 224 may be circular and may be located substantially equidistant from the surface 196 and the surface 198 of the arm 178. The size and location of the openings 222 and 224 may vary, in various embodiments, based on, for example, the types of hardware used in the mounting assemblies. Openings 226 and 228 in the arm 180 may be similar in position and extension to the openings 222 and 224 in the arm 178. The openings 222 in the arm 178 and 226 in the arm 180 are generally located along the length of the arms 178 and 180 such that the openings 222 and 226 directly oppose one another, such that the center points of the openings 222 and 226 align with the axis 7. For example, a line drawn between the openings 222 and 226 coincides with the axis 7 when the openings 222 and 226 directly oppose one another.

With reference to FIG. 2, the arm 178 generally extends perpendicular from the surface 186 of the cross-member 176 such that the angle between the surface 186 of the cross-member 176 and the surface 198 of the arm 178 is substantially 90° and the surface 196 of the arm 178 is coplanar with the end portion 182 of the cross-member 176. Similarly, the arm 180 generally extends perpendicular from the surface 186 of the cross-member 176 such that the angle between the surface 186 of the cross-member 176 and the surface 208 of the arm 180 is substantially 90° and the surface 212 of the arm 180 is coplanar with the edge 184 of the cross-member 176. Further, the length of the arm 178 from the surface 186 of the cross-member 176 to the distal end 194 and the length of the arm 180 between the surface 186 of the cross-member 176 to the distal end 204 are roughly equal.

In various implementations, the structure of the movable support 106 may differ from the movable support 106 shown in FIG. 2. For example, the arm 178 and the arm 180 may extend outward from the cross-member 176 at an angle. For example, the angle between the surface 198 of the arm 178 and the surface 186 of the cross-member 176 may be greater than or less than 90° to accommodate different sizes of containers. In some implementations, the arms 178 and 180 may be joined to the cross-member 176 using hinges or other adjustable mechanisms such that the distance between the distal ends 194 and 204 may be reduced to accommodate smaller containers and increased to accommodate larger containers, varying the angles of the arms 178 and 180 relative to the cross-member 176. In some implementations, an additional cross-member may extend between the distal ends 194 and 204 of the arms 178 and 180 such that the additional cross-member is parallel to the cross-member 176 and the movable support 106 forms a rectangle. In some implementations, the cross-member 176 and the arms 178 and 180 may be curved in one or two planes or may be a combination of curved and linear members. The movable support may be implemented using other structures. For example, the gimbaled container 700 shown in FIG. 23 includes a movable support 706 implemented by a single member. Other variations in types, layout, and number of cross-members and arms are contemplated.

With reference to FIGS. 3 and 5A, the fixed support 104 and the movable support 106 are connected using a connecting assembly 110. The connecting assembly 110 generally includes a bearings 230 and 302 and an axle 234. In the example support 102 shown in FIG. 2, the connecting assembly 110 rotatably connects the movable support 106 to the fixed support 104 about axis 5.

With reference to FIG. 3, the axle 234 is rotatably supported within the aperture 166 of fixed support 104 by bearings 230 and 302. The axle 234 may have a variable cross-section along its length. For example, the axle 234 includes a first segment 236 with a circular cross-section. A second segment 238 may have a different cross-section, which may be, for example, a non-circular shaped cross-section, such as for example a square cross-section. The axle 234 also includes a third segment 240 with a circular shaped cross-section having a larger diameter than the first segment 236. In this example, the first segment 236 is a central portion of the axle 234, the second segment 238 may be a first end portion of the axle 234, and the third segment 240 may be a second end portion of the axle 234. The first and second end portions may be opposing ends. Cross-sectional shapes and dimensions of the axle 234 may vary based on, for example, dimensions of the bearings 230 and 302 and other components of the connecting assembly 110. In some implementations, the axle 234 may have additional sections. Further, a length of the axle 234 may vary based on dimensions of the fixed support 204 and the movable support 206. In some implementations, various parts of the axle 234 may be threaded or otherwise adapted for use with a fastener. For example, a portion of the third segment 240 of the axle 234 may be threaded for receiving a nut or other securing hardware.

Figure 5B:
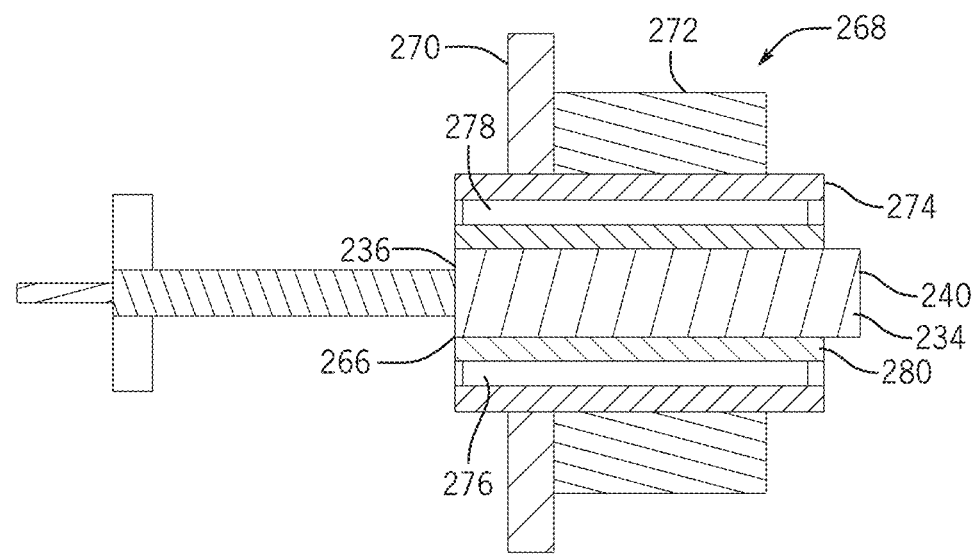
FIG. 5B is a section view of example bearings for a gimbaled container.

With reference to FIG. 5A, the bearing 230 may be implemented by many structures allowing for rotation of the axle 234 within the bearing 230. For example, the bearing 230 may be implemented by roller bearings, ball bearings, bushings, or fluid bearings, in various embodiments. FIG. 5B shows an example roller bearing 268 that may be used to implement the bearing 230 in some implementations. The roller bearing 268 includes a plate 270 and a block 272 that may be rotatably fixed with respect to a structure (e.g., the fixed support 204). An outer race 274 is fixed with respect to the block 272 and the plate 270. Low friction rollers (e.g., rollers 276 and 278) located between the outer race 274 and a rotatable inner race 280 allow the inner race 280 to rotate with respect to the outer race 274. A shaft, such as the portion 240 of the axle 234 may be press-fit into a bore 266 formed by the inner raceway 280 such that the axle 234 is rotatably fixed with respect to the inner race 280.

With reference to FIG. 3, the bearing 230 may include a plate 292 including openings 294, 296, 298, and 300 that correspond and align with apertures 168, 172, 170 and 174. The fasteners 304, 306, 308, 310 are positioned through respective aligned openings and apertures to secure the bearing 230 to the fixed support 204. In various implementations, the openings 294, 296, 298, and 300 may be structured for use with specific types of fasteners. For example, the openings 294, 296, 298, and 300 may be threaded for use with a screw. In some implementations, the plate 292 may not include openings 294, 296, 298, and 300. In yet another implementation, the bearing 230 may not include the plate 292.

Figure 6A:
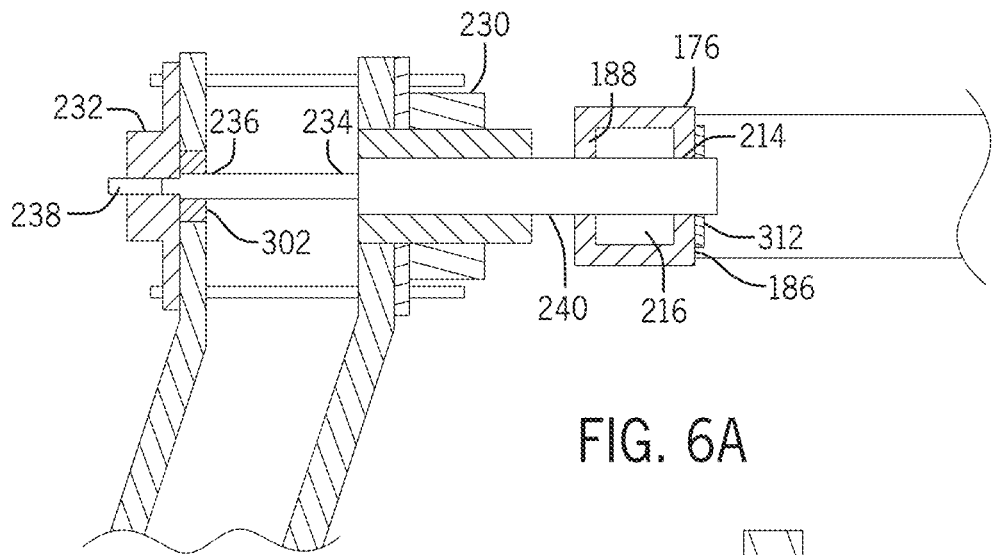
FIG. 6A is a section view of an example support for a gimbaled container, taken along line 5-5 of FIG. 2.
Figure 6B:
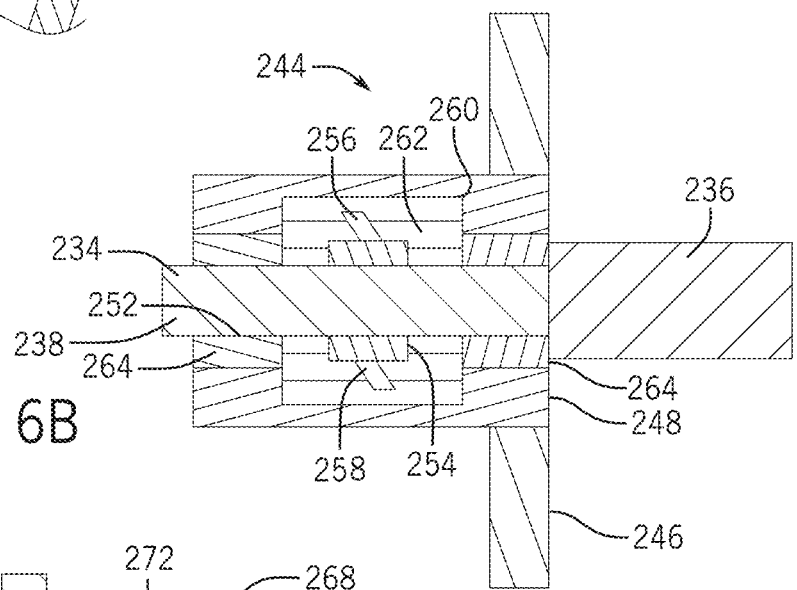
FIG. 6B is a section view of an example rotational damper for a gimbaled container.
Figure 6C:
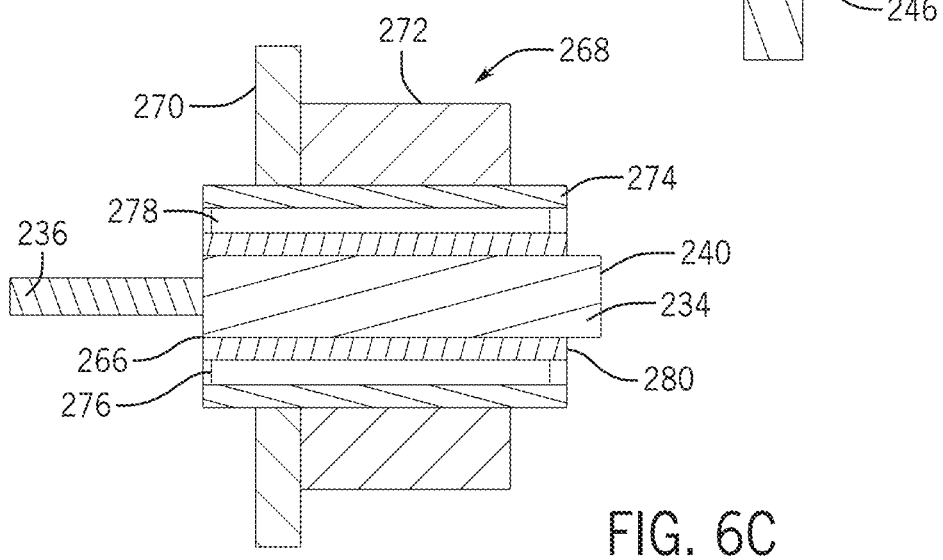
FIG. 6C is a section view of an example bearing for a gimbaled container.

With reference to FIGS. 4, 6A, and 6B, the connecting assembly 110 may, in some implementations, include a rotational damper 232. The rotational damper 232 may be any type of structure that creates resistance to rotation. For example, in various implementations, the rotational damper 232 may be implemented using a press fit bushing, disc brake, spring dampener, or viscous dampener. FIG. 6B shows an implementation of the rotational damper 232 using a viscous damper 244. The rotational damper 232 is generally bidirectional, such that the rotational damper creates resistance to rotation in either direction (e.g., clockwise or counterclockwise) about an axis. The rotational damper 232 may, in some implementations, limit rotational movement to less than a full 360° of rotation.

The viscous damper 244 includes a plate 246 and a housing 248 fixed with respect to the plate 246 (e.g., press fit or welded to the plate 246). A bore 252 through the viscous damper 244 receives a rotating shaft, such as the second segment 238 of the axle 234. A collar 254 encircles the rotating shaft 238 and is fixed with respect to the axle 234 when the axle 234 is in the bore 252. For example, the collar 254 may include a keyed opening corresponding to the cross-section of the second segment 238 of the axle 234 such that the axle 234 drives the collar 254 as it rotates. The collar 254 includes fins (e.g., fins 256 and 258), which are fixed with respect to the collar 254. As the axle 234 rotates, the fins 256 and 258 rotate within a cavity 260 formed in the housing 248 filled with a viscous fluid 262. The viscous fluid 262 provides resistance to rotation by the fins 256, 258, slowing rotation of the axle 234. The housing 248 may also include rings 264 of low-friction material to allow for rotation of the axle 234 within the housing 248. The viscous damper 244 is shown as one example of a viscous damper. Other configurations of viscous dampers may be used to implement the rotational damper 232. For example, viscous dampers may use a vane, disk, or other element in place of fins or may include different configurations of components within the housing.

With reference to FIG. 4, the damper 232 may include a plate 282 including openings 284, 286, 288, and 290 that correspond to and align with apertures 168, 172, 170, and 174. Fasteners 304, 306, 308, and 310 are positioned through respective aligned openings and apertures to secure the damper 232 to the fixed support 204. In various implementations, the openings 284, 286, 288, and 290 may be structured for use with specific types of fasteners. For example, the openings 284, 286, 288, and 290 may be threaded for use with a screw. In some implementations, the plate 282 may not include openings 284, 286, 288, and 290 and may be welded to the fixed support 204. In yet another implementation, the damper 232 may not include the plate 282.

Figure 19B:
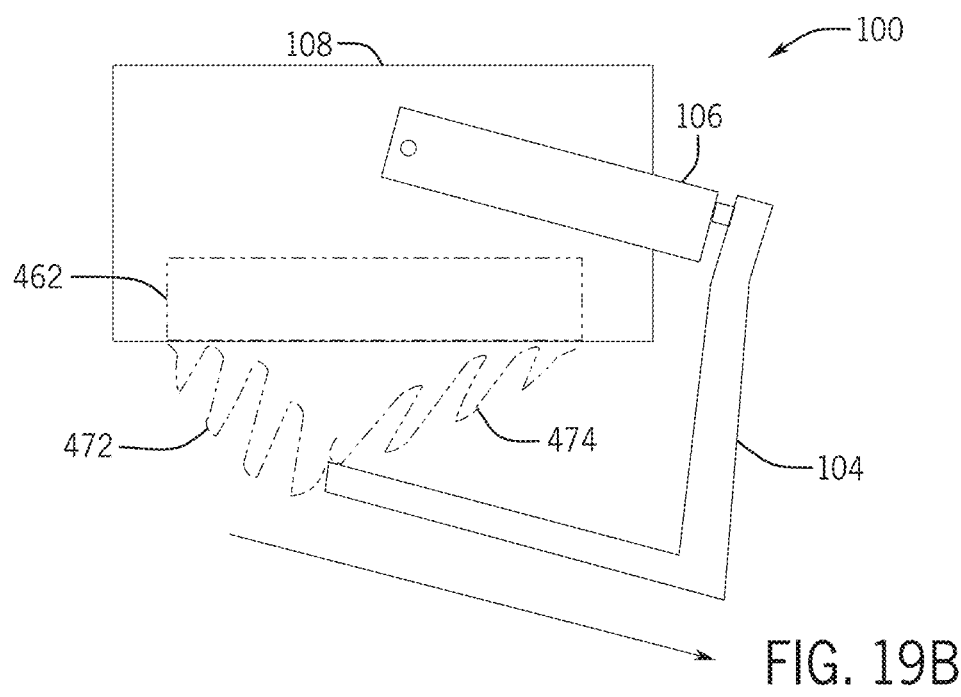
FIG. 19B illustrates an example gimbaled container during rotation along a second axis.

In some implementations, the gimbaled container 100 may include a damper mechanism external to the connecting assembly. For example, FIG. 19B shows, in broken lines, springs 472 and 474, which may be used to implement a damper mechanism with respect to rotation of the container 108 about the axis 7.

With continued reference to FIG. 3 and with reference to FIG. 4, the connecting assembly 110 mounts to the fixed support 104. A bushing 302 may be press fit in the opening 166 in the fixed support 104. The first segment 236 of the axle 234 is then positioned within the bushing 302. Where the connecting assembly 110 includes a rotational damper 232, the second segment 238 of the axle 234 is inserted into the keyed collar (or other opening) of the damper 232 and the third segment 240 of the axle 234 is inserted into the bearing 230. The openings 284, 286, 288, 290 of the damper 232, openings 168, 170, 172, 174 of the fixed support 204, and openings 294, 296, 298, 300 of the bearing 230 are aligned and fasteners 304, 306, 308, and 310 are inserted through the respective openings to secure the damper 232 and the bearing 230 to the fixed support 204. In some implementations, such as shown in FIG. 5A, a portion of the bearing 230 may be press fit into the opening 266 of the fixed support 204.

With reference to FIG. 5A, the third segment 240 of the axle 234 fits through the opening 214 in the cross-member 176 of the movable support 106 from the surface 188, protruding past the opposing surface 186. As shown in FIG. 5A, the axle 234 may be fixed with respect to the movable support 106 by a fastener 312 to limit or eliminate rotation of the axle 234 relative to the movable support 106. In various implementations, the fastener 312 may be implemented using, for example, a plate, nut, or other component that screws onto a threaded portion of the axle 234 and is fixed to the surface 186 of the cross-member 176 (e.g, through welding, additional screws, bolts, or other hardware). Because the movable support 106 is substantially fixed with respect to the axle 234, as the axle 234 rotates within the bearing 230 and the damper 232, the movable support 106 also rotates with respect to the fixed support 104. In various implementations, the axle 234 may be fixed with respect to the movable support 206 using a keyed joint or welding.

Figure 21:
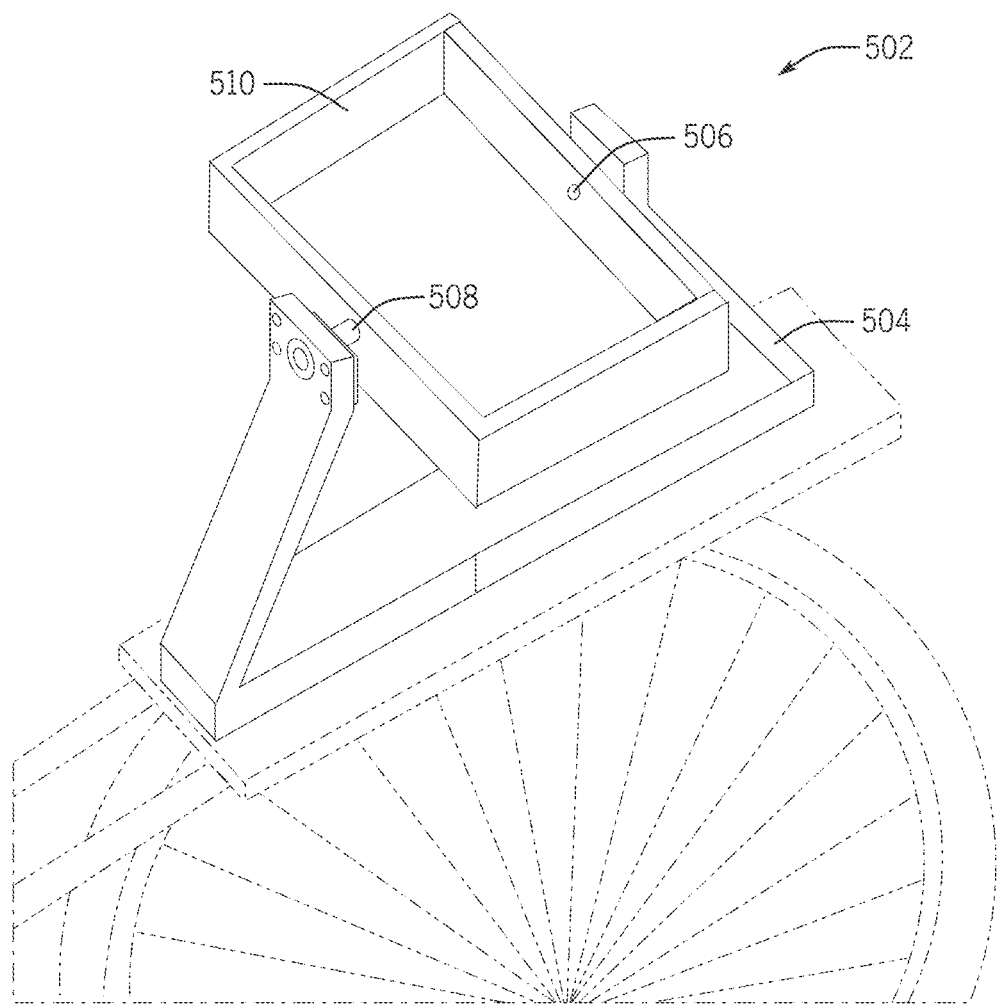
FIG. 21 illustrates an example gimbaled container.

In various embodiments, a support for a gimbaled container 100 may vary from the support 102 described above. For example, in some implementations (such as the support structure 502 shown in FIG. 21), a fixed support 504 may include two connecting assemblies 506, 508, providing two connection points between the fixed support 504 and the movable support 510. For example, the movable support may include two cross-members extending between the arms and each of the cross-members may be connected to the fixed support by connecting assemblies, either of which may or may not include rotational dampers. Though the movable support 106 is described as fixed with respect to the axle 234, in some implementations, the axle 234 may be fixed with respect to the fixed support 104 and the movable support 106 may rotate about the axle 234. In these implementations, the damper 232 may be mounted to the cross-member 176 and the cross-member 176 may further include a bearing or bushing similar to the bearing 230. Other variations to the structure of the support 102 are contemplated.

Returning to FIG. 1, the gimbaled container 100 further includes a container 108 rotatably connected to the support 102 by mounting assemblies 314. Though shown as having a box-shape in FIG. 1, the container 108 may be a variety of shapes depending on the desired contents of the container 108. For example, a rectangular container 108 may be used to fit pizza boxes or other large boxes of food while cylindrical containers may be used for delivery of plates of food.

Figure 10:
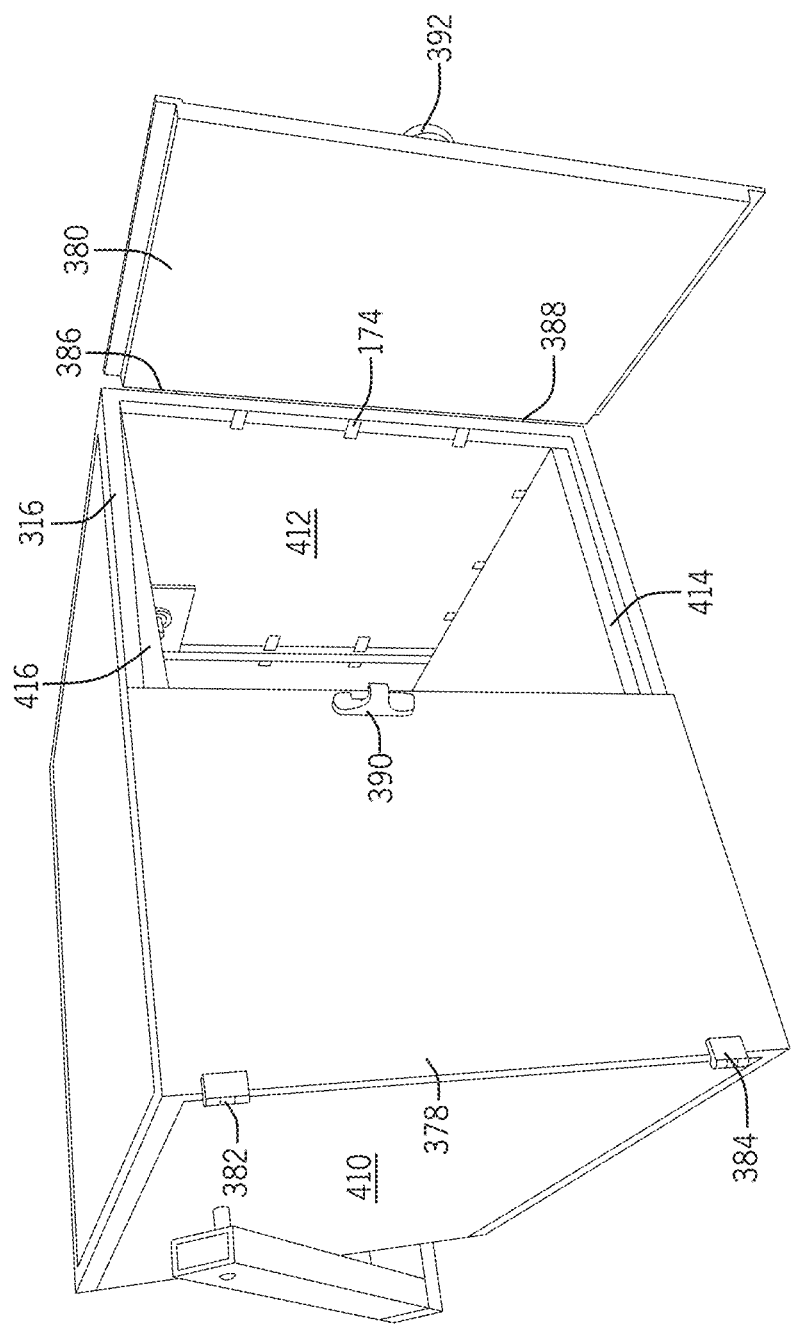
FIG. 10 illustrates a perspective view of an example container of a gimbaled container.

As shown in FIG. 10, the container 108 may be constructed to include a frame 316, panels mounted to the frame 316 (e.g., panels 410 and 412 shown in FIG. 10), and one or more doors (e.g., doors 378 and 380) providing access to the interior chamber of the container 108. As further shown in FIG. 10, the container 108 may be further provided with additional features such as insulation layers 414 and 416.

Figure 8:
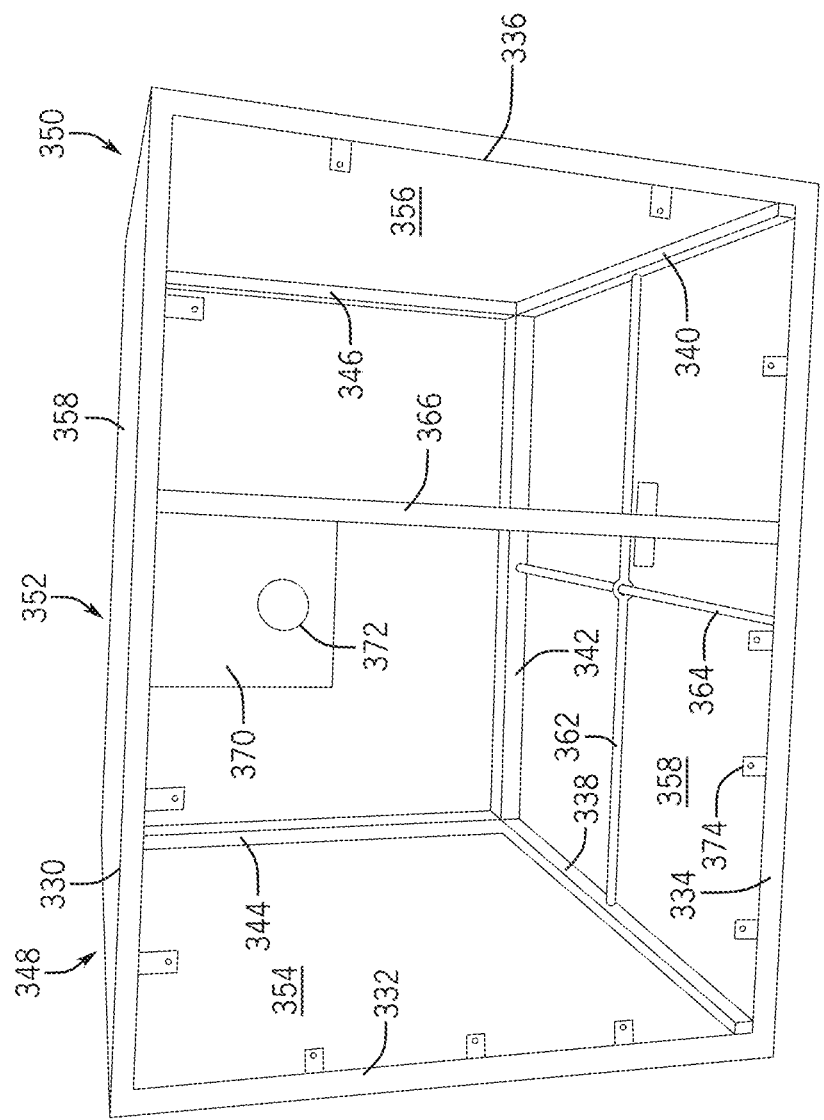
FIG. 8 illustrates a perspective view of an example frame of a gimbaled container.

Turning to FIG. 8, the frame 316 may be formed by strut members 330, 332, 334, 336, 338, 340, 342, 344, 346, 348, 350, and 352 secured together to form the outline of a cube structure. In one implementation, the strut members are hollow aluminum tubes with a square cross section. In various other implementations, the strut members may have different cross-sections (e.g., circular rods), solid members, etc. Further, the strut members may be formed from different materials including high strength plastic, steel, alloys, nylon, carbon fiber, wood, etc. As shown in FIG. 8, where the strut members are formed by aluminum tubes or members, the strut members may be joined to one another by welding.

Other types of fasteners, including corner brackets, screws, or bolts may also be used to join the strut members in various implementations.

In some implementations, panels (e.g., panels 354, 356, 358, and 360) may be fixedly connected to the frame 316 to form the outer walls of the container 108. For example, the panels 354, 356, 358, and 360 may be constructed using aluminum sheeting welded to the strut members of the frame 316. Cross-braces 362 and 364 may provide additional structure between the strut members to strengthen the frame 316. For example, cross-brace 364 is connected to both the strut member 334 and the strut member 342 at roughly a midpoint of each of the strut members 334 and 342. The cross-brace 362 is connected to both the strut member 338 and the strut member 340 at roughly the midpoint of each of the strut members 338 and 340. The cross-braces 362 and 364 may provide additional structure to the frame 316 and may bear loads (e.g., food placed in the container 108) instead of loads being placed directly on the panel 358.

Attachment structures, such as brackets 374 may be fixedly attached to the strut members 330, 332, 334, 336, 338, 340, 342, 344, 346, 348, 350, and 352 and/or the struts 366 and 368 for attaching panels, such as panels 354, 356, 358, and 360 or panels not shown in FIG. 8, to the container 108. The brackets 374 may, in some implementations, receive be welded to both a panel and an strut member to further secure the panel to the strut member. Brackets 374 may also be welded to an strut member such to receive a fastener (e.g., a screw) for fastening a panel to the strut member. For example, brackets 374 welded to the strut member 332, 334, 330, and the strut 366 provide openings to receive a fastener for fastening a panel (not shown in FIG. 8) to the container 108.

Figure 9A:
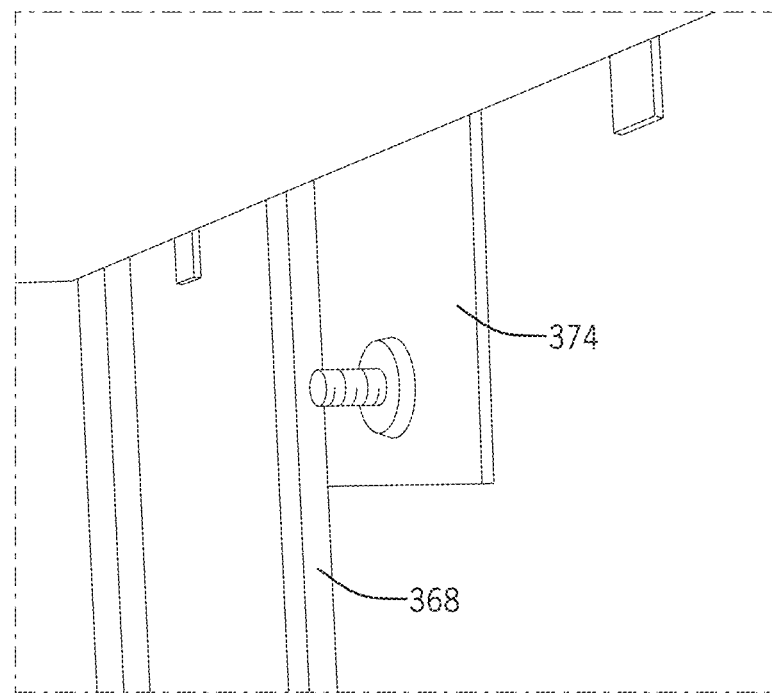
FIG. 9A is an example mounting assembly for rotatably mounting a container to a support structure of a gimbaled container.
Figure 9B:
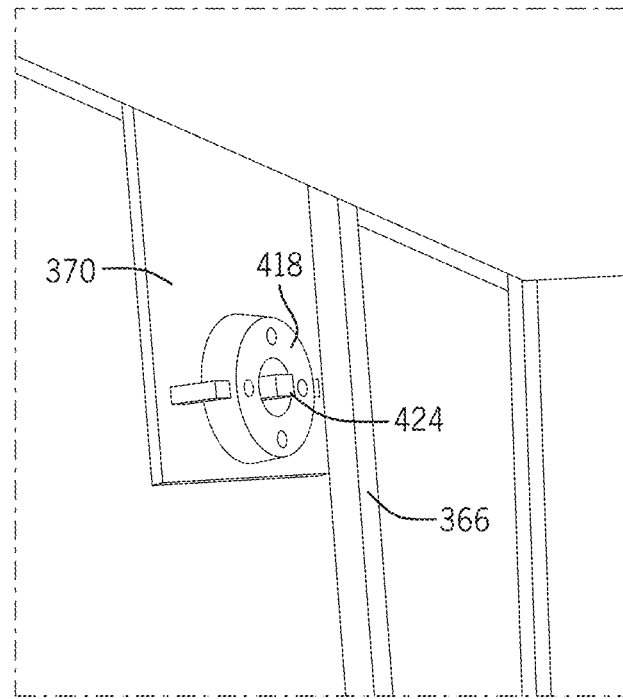
FIG. 9B is an example mounting assembly for rotatably mounting a container to a support structure of a gimbaled container.

Struts, such as struts 366 (shown in FIG. 9B) and 368 (shown in FIG. 9A) may also be connected to the frame 316 to provide additional strength to the container. The strut 366 extends perpendicular to and between the strut members 330 and 334 while the strut 368 extends perpendicular to and between the strut members 342 and 352. Struts 366 and 368 may be formed from the same members as the strut members (e.g., hollow aluminum rods with a square cross-section) or may be formed from a different material with different dimensions from the strut members. For example, in some implementations, the struts 366 and 368 may be constructed of steel for increased durability and load bearing. The struts 366 and 368 may be connected to the strut members at a location other than the midpoint. For example, the strut 366 in FIG. 8 is connected to the strut members 330 and 334 closer to the strut member 336 than the strut member 332. The exact location may be determined by dimensions of a mounting plate 370 fixed to the strut 366, such that an opening 372 through the mounting plate 370 is located approximately at the midpoint of the strut members 330 and 334.

With continued reference to FIG. 8, the mounting plate 370 may be attached (e.g., by welding) to the strut member 330 and the strut 366. In various embodiments, the mounting plate 370 may be integrally formed with a panel of the container 108 or may be adhered or fastened to a panel of the container 108. The mounting plate 370 may be constructed from a steel plate, aluminum plate, or other rigid materials. An opening 372 in the mounting plate 370 may be located roughly equidistant from the two edges of the mounting plate 370 parallel with the strut 366, such that the opening 372 is located roughly equidistant from the strut members 336 and 332 (e.g., roughly at the center of the width of the container 108). The location of the opening 372 relative to the strut member 330 may be chosen based on a desired height of the container 108 relative to the support 102. Generally, the opening 372 may be located closer to the strut member 330 than to the strut member 334 (e.g., above the center of the height of the container 108), to maintain a low center of gravity for contents of the container 108. However, in various implementations, the opening 372 may be located closer to the center of the height of the container 108 to, for example, eliminate collision between the container 108 and the fixed support 104 or other parts of the structure of the gimbal device.

Figure 12:
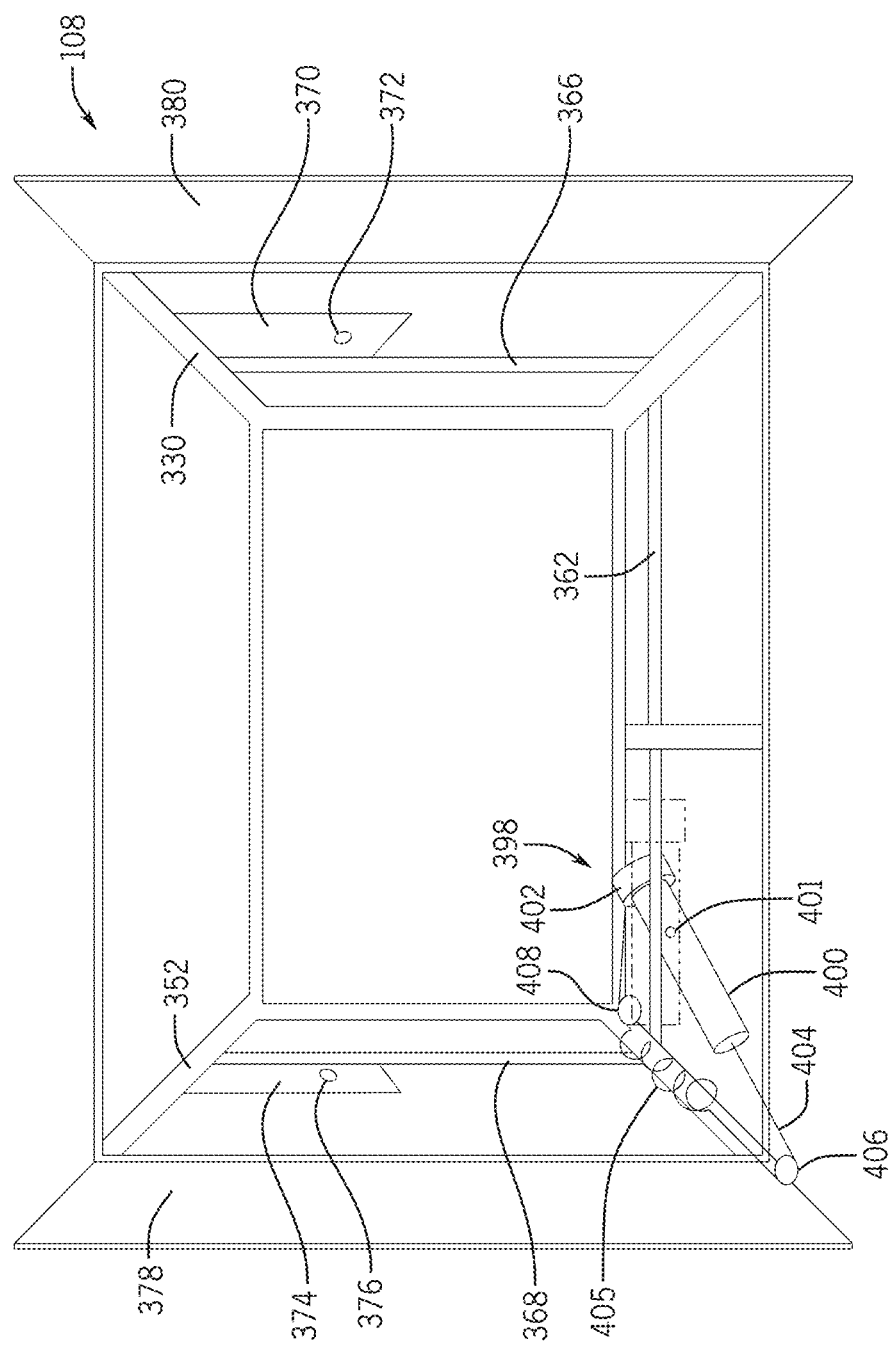
FIG. 12 illustrates an example container, including a compensating weight within the container.

With reference to FIG. 12, a mounting plate 374 may be attached to the strut 368 and the strut member 352 opposing the mounting plate 370. Generally, the mounting plate 374 may be constructed and implemented similarly to the mounting plate 370. In some implementations, the mounting plate 374 and the mounting plate 370 may differ. For example, the opening 376 in the mounting plate 374 may be sized differently than the opening 372 in the mounting plate 370. The opening 372 may oppose the opening 376 such that a connecting line extending perpendicular to the mounting plate 370 from the center of the opening 372 coincides with the center of the opening 376.

With reference to FIG. 10, the container 108 may include doors 378 and 380 to provide access to the interior of the container 108. The door 378 may be connected to the container 108 via hinges 382 and 384 fixed to both the door 378 and the strut member 344 of the container 108. Similarly, the door 380 may be connected to the container 108 via hinges 386 and 388 fixed to both the door 380 and the strut member 332 of the container 108. The door 378 may include a catch 390 and the door 380 may include a latch 392 such that when the latch 392 engages the catch 390, the doors 378 and 380 remain closed over the container 108. In various implementations, the doors 378 and 380 may connect to one another via different types of closures such as handles, sliding latches, keyed locks, or brackets configured to receive a lock.

Figure 11:
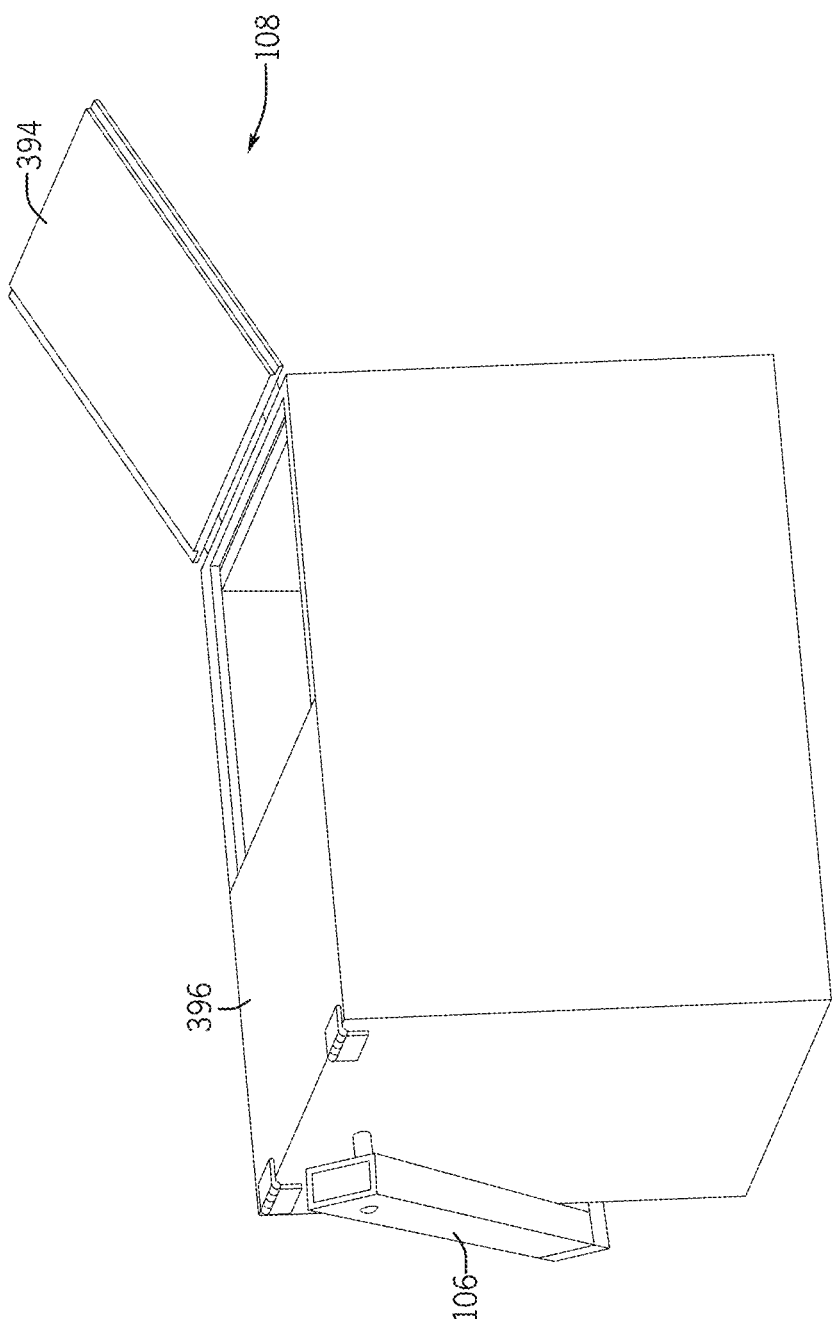
FIG. 11 illustrates a perspective view of an example gimbaled container.

In various embodiments, the doors 378 and 380 may be configured or mounted differently to the container 108. For example, with reference to FIG. 11, the container 108 may include doors 394 and 396 located on top of the container 108 relative to the movable support 106. In other implementations, the container 108 may include only one door, which may be connected to the container 108 using one or more hinges fastened to the door and an strut member of the container 108. The container 108 may also include one or more sliding doors. For example, the doors 394 and 396 may be engaged with tracks located inside of the container 108 such that the doors 394 and 396 slide with respect to one another (e.g., the door 394 slides over the door 396) to access the interior of the container 108. Further, some embodiments of the container 108 may include doors that disengage entirely from the container 108 to access the container. Further, various embodiments of the container 108 may include doors on multiple faces of the container 108 which may provide different angles of access to the container 108 or may access sub-compartments within the container 108.

With reference to FIG. 12, in some implementations, the container 108 may include a weight compensating assembly 398 that may offset weight of the doors 378 and 380 relative to the container 108 when the doors are opened. The weight compensating assembly 398 changes the center of gravity of the container such that the container 108 does not tilt, or tilts less than it would without the weight compensating assembly, due to the weight of the doors 378 and 380. Generally, the weight compensating assembly 398 is configured such that a weighted portion 402 moves in a direction opposite the direction of the weight transfer caused by the opening of the door 378, such as towards the rear wall opposite the front wall on which the doors are positioned as the door 378 opens to adjust distribution of weight within the container 108 and maintain a balance. Similarly, the weight compensating assembly 398 may be configured such that the weighted portion 402 moves towards the door 378 as the door 378 closes. A similar weight compensating assembly may be installed and used relative to the door 380 in some implementations.

With continuing reference to FIG. 12, in one embodiment, the weight compensating assembly 398 includes a member 400, which may be, for example, a bar or rod. A weighted portion 402 of the member 400 may be weighted to offset the weight of the door 378 and/or the door 380. A cord 404 may connect the member 400 to a pulley 406 mounted to the door 378 and a pulley 408 mounted near the rear wall of the container 108. The member 400 may be fixed to the container 108 via a pivot point 401 such that, when the door 378 opens, the weighted portion 402 of the member 400 is pulled away from the door 378. Conversely, when the door 378 is closed, the weighted portion 402 of the member 400 may be pivoted by the cord 404 and a spring 405 attached to the cord 404 to a neutral position (e.g., under the cross-brace 362 along a center of the container 108, shown in broken lines in FIG. 12). In other embodiments, various other types of weight compensating assemblies may be used. For example, a weight may be magnetically coupled to the door 378 such that the weight moves away from the door 378 as it opens and towards the door 378 as it closes. Other types of assemblies are contemplated including springs, pulleys, rotational elements, winches, drift anchors, and the like.

With reference to FIG. 10, panels 410 and 412 may be connected to the frame 316 to form the container 108. The panels 410 and 412 may be constructed of different materials than other components of the container 108 to reduce weight, provide better thermal properties, or reduce cost. For example, the panels 410 and 412 may be constructed using PVC sheets, other plastic sheets, styrofoam, or other materials. The panels 410 and 412 may be connected to the fame 316 via brackets 374. For example, FIG. 10 shows panel 412 attached to the frame 316 via fasteners received by the brackets 374. In other implementations, panels 410 and 412 may be adhered, welded, or otherwise attached to the frame 316. Further, in various implementations, the number and types of panels secured to the frame 316 may vary.

With continuing reference to FIG. 10, in some implementations, the container 108 may include insulation layers 414 and 416. While insulation layers 414 and 416 are shown at the top and bottom of the container 108, insulation layers may also be used in other locations within the container 108 (e.g., adjacent to lateral walls or rear walls) in various implementations. The insulation layers 414 and 416 may, in some implementations, be covered by an additional rigid surface. For example, the insulation layer 414 may be covered by a protective sheet, such as a sheet of PVC material, such that items can be set on the bottom of the container 108 without damaging the insulation layer 414. The insulation layers 414 and 416 may be constructed using foam sheets, spray foam insulation, or other types of insulation as desired.

Figure 14A:
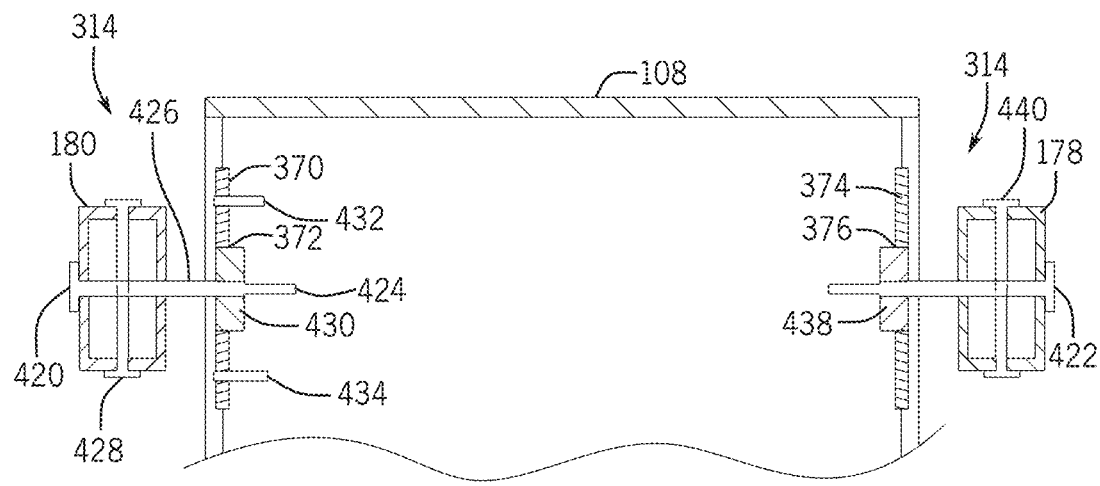
FIG. 14A illustrates a front section view of a gimbaled container, taken along line 14-14 of FIG. 13.
Figure 16A:
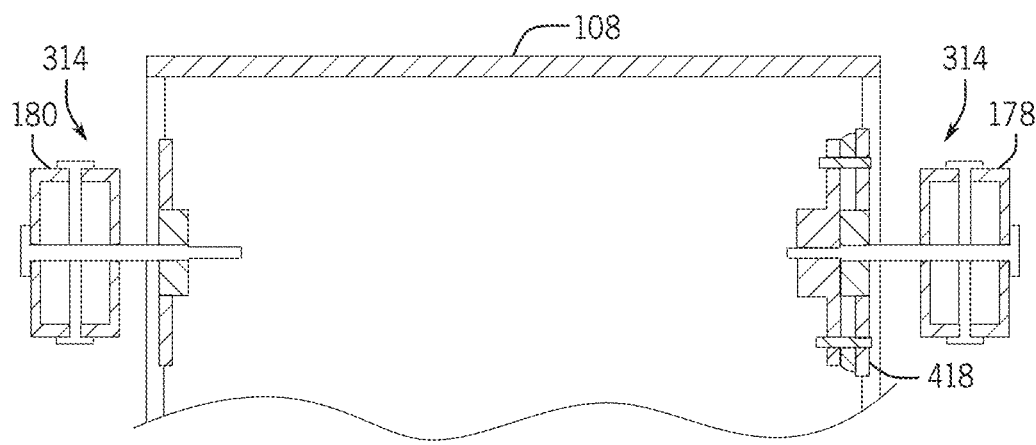
FIG. 16A illustrates a front section view of an example gimbaled container.
Figure 16B:
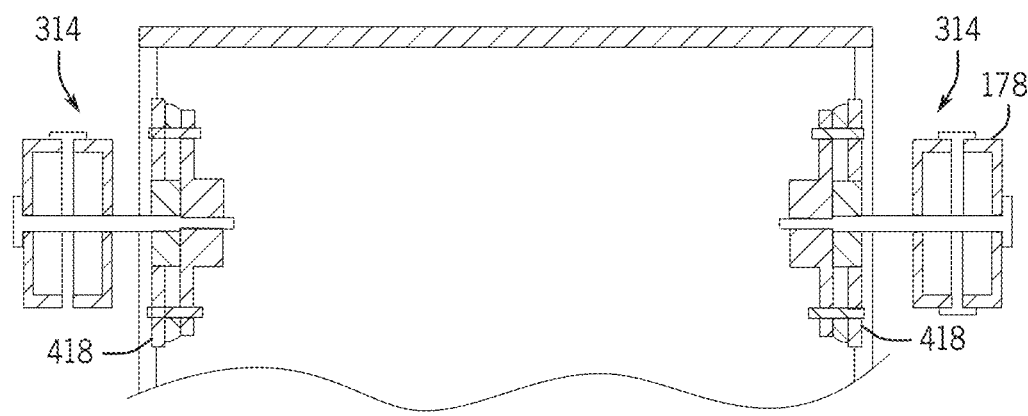
FIG. 16B illustrates a front section view of another example gimbaled container.
Figure 17:
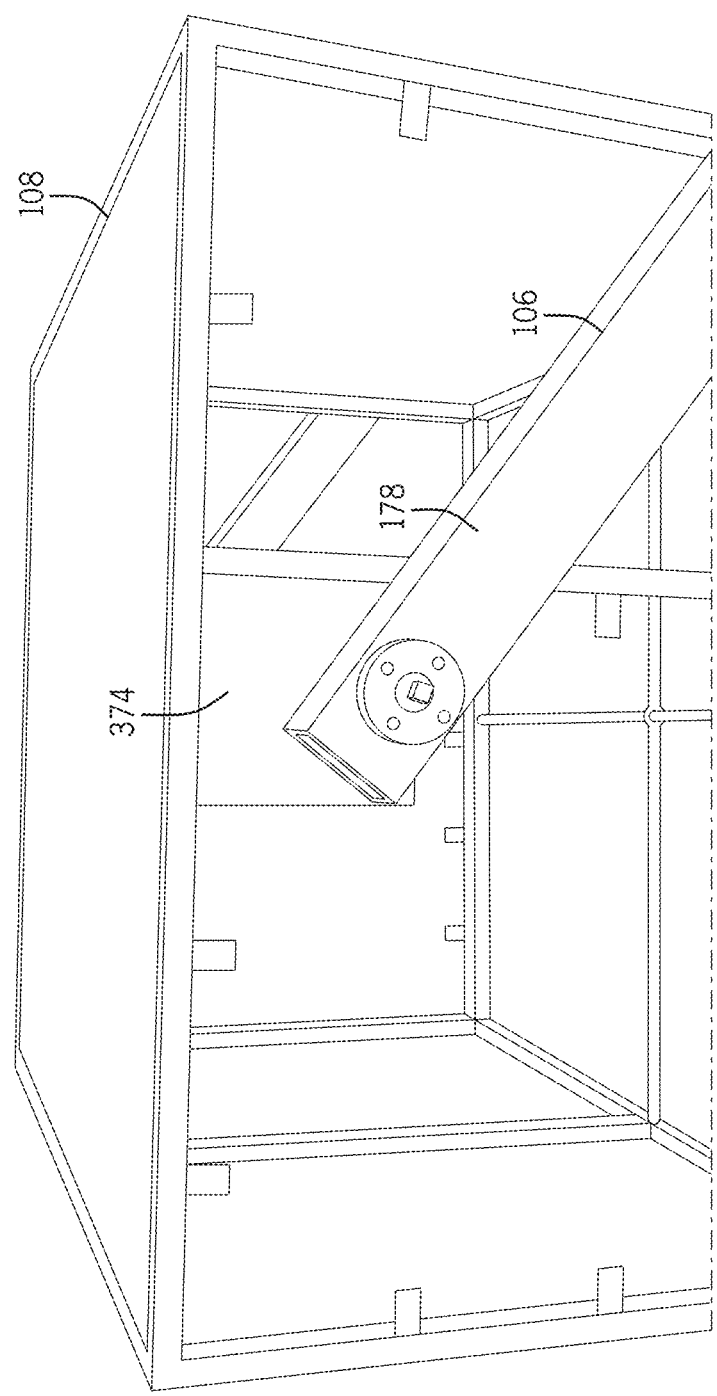
FIG. 17 illustrates a side perspective view of an example gimbaled container.

With reference to FIG. 14A, the container 108 may include a mounting assembly 314 connecting each of the arms 180 and 178 to the container 108. As shown in FIG. 14A, a mounting assembly 314 may include a bearing (e.g., bearings 420 and 438) to allow rotation of the container 108 about the axis 7-7 relative to the movable support 106. As shown in FIG. 15A, in some implementations, a rotational damper 418 is included in the mounting assembly 314 connecting the arm 180 and not included in the mounting assembly 314 connecting the arm 178 to the container 108. With reference to FIG. 16A, in another implementation, the mounting assembly 314 connecting the arm 178 to the container 108 may include a rotational damper 418 and the mounting assembly 314 connecting the arm 180 to the container 108 may not include a rotational damper 418. With reference to FIG. 16B, in yet another implementation, each of the connecting assemblies 314 may include a rotational damper 418. With reference to FIG. 17, in some implementations, the mounting plates 374 and 370 may rotationally restrain axles while bearings and/or rotational dampers are located at one or both of the arms 178 and 180.

Returning to FIG. 14A, each of the mounting assemblies 314 may include an axle fixed with respect to the arm and bearings within the container 108 fixed with respect to the container 108 to allow the container 108 to rotate relative to the axle, such that the axle is rotatably supported by the bearings of the mounting assemblies 314. The mounting assembly 314 connecting the arm 180 to the container 108 may include an axle 420 with a first segment 424 and a second segment 426. The first segment 424 may have a cross-section that is non-circular, such as a square shaped cross-section. The second segment 426 may have a circular cross-section.

The second segment 426 of the axle 420 may also include an opening through the axle such that a pin 428 may be inserted through the opening to retain the axle 420 in place with respect to the arm 180. The pin 428 may be secured relative to the arm 180 by welding or other structures. In some implementations, the axle 420 may be secured relative to the arm via welding or other structures. The second portion 426 of the axle 426 may extend from the arm 180 through the bearing 430. The bearing 430 may be fixed to the mounting plate 370 by press fitting the bearing 430 into the aperture 372 in the mounting plate 370. Further, in some implementations, the bearing 430 may be welded or otherwise fixed to the mounting plate 370. Because the mounting plate 370 is fixed with respect to the container 108, as the container 108 rotates, the bearing 430 rotates with the container 108 around the axle 420.

Figure 14B:
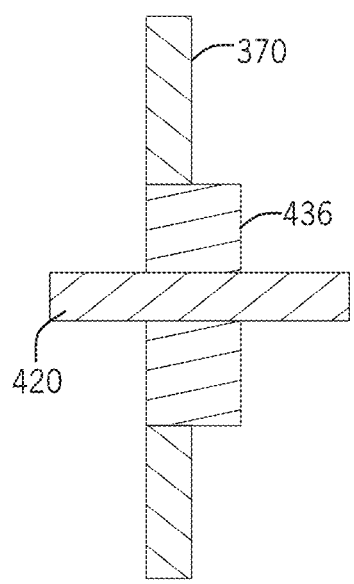
FIG. 14B illustrates an example mounting assembly for a gimbaled container.

With continued reference to FIG. 14A, the bearing 430 may be press fit in the aperture 372 of the mounting plate 370. The bearing 430 may be implemented by many structures allowing for rotation of the axle 420 within the bearing 430. For example, the bearing 430 may be implemented by roller bearings, ball bearings, bushings, or fluid bearings, in various embodiments. FIG. 14B shows an implementation of the mounting structure 314 where the bearing 430 is implemented by a bushing 436 press fit into the mounting plate 370. The bushing 436 may comprise a low friction inner surface such that the bushing 436 allows the container 108 to rotate about the axle 420.

Returning now to FIG. 14A, the mounting assembly 314 connecting the arm 178 to the container 108 may include a bearing 438 press-fit into the aperture 376 of the mounting plate 374. An axle 422 may be rotatably fixed within the arm 178 by a pin 440 in the same or a similar manner as the axle 420 is retained with respect to the arm 180. The bearing 438 may allow the container 108 to rotate about the axle 422 by rotating about the stationary axle 422 as the container 108 rotates.

Figure 14C:
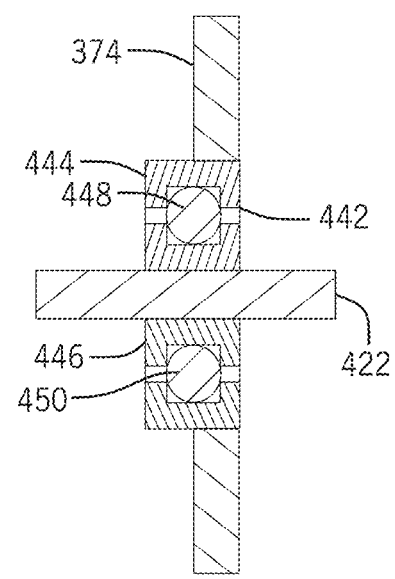
FIG. 14C illustrates an example mounting assembly for a gimbaled container.

The bearing 438 may be implemented by bearing structures discussed with respect to the bearing 230 and the bearing 436 to rotatably support the container 108 as it rotates about the axle 422. FIG. 14C shows an implementation of the bearing 438 using a ball bearing 442 rotating around the axle 422. The ball bearing 442 includes an outer race 444 fixed with respect to the mounting plate 374. Low friction balls (e.g., balls 448 and 450) located between the outer race 444 and a rotatable inner race 446 allow the outer race 444 to rotate with respect to the inner race 446. A shaft, such as the axle 422, may be press-fit into a bore formed by the inner race 446 such that the axle is rotatably fixed with respect to the inner race 446.

With reference to FIG. 15A, one or both of the mounting assemblies 314 may include a rotational damper 418. Rotational dampers 418 may be included within the container 108 to resist or slow rotation of the container 108 about the axle 420. The mounting assembly 314 connecting the arm 180 to the container 108 may include an axle 420 with a first segment 424 and a second segment 426. The first segment 424 may have a cross-section that is non-circular, such as a square shaped cross-section. The second segment 426 may have a circular cross-section.

The second segment 426 of the axle 420 may also include an opening through the axle such that a pin 428 may be inserted through the opening to retain the axle 420 in place with respect to the arm 180. The pin 428 may be secured relative to the arm 180 by welding or other structures. In some implementations, the axle 420 may be secured relative to the arm via welding or other structures. The second portion 426 of the axle 426 may extend from the arm 180 to the bearing 430. The first portion 424 of the axle 420 extends through the rotational damper 418. The rotational damper 418 and bearing 430 are each fixed to the mounting plate 370. The rotational damper 418 may be fixed to the mounting plate 370 by fasteners 432 and 434. The bearing 430 may be fixed to the mounting plate 370 by press fitting the bearing 430 into the aperture 372 in the mounting plate 370. Further, in some implementations, the rotational damper 418 may be welded to the mounting plate 370. For example, FIG. 7B shows the rotational damper 418 welded to the mounting plate 370. Because the mounting plate 370 is fixed with respect to the container 108, as the container 108 rotates, the bearing 430 and the rotational damper 418 rotate with the container 108 around the axle 420.

The rotational damper 418 may be any type of structure that creates resistance to rotation. For example, in various implementations, the rotational damper 418 may be implemented using a press fit bushing, disc brake, spring dampener, or viscous dampener. FIG. 14B shows an implementation of the rotational damper 418 using a viscous damper 244, described in detail elsewhere. The first portion 424 of the axle 420 may be keyed to the collar 254 such that, as the damper 418 rotates with the mounting plate 370 around the stationary axle 420, the collar 254 rotates, causing the fins 256 and 258 to move through the viscous fluid 262, creating resistance to the rotation of the container 108.

Figure 13:
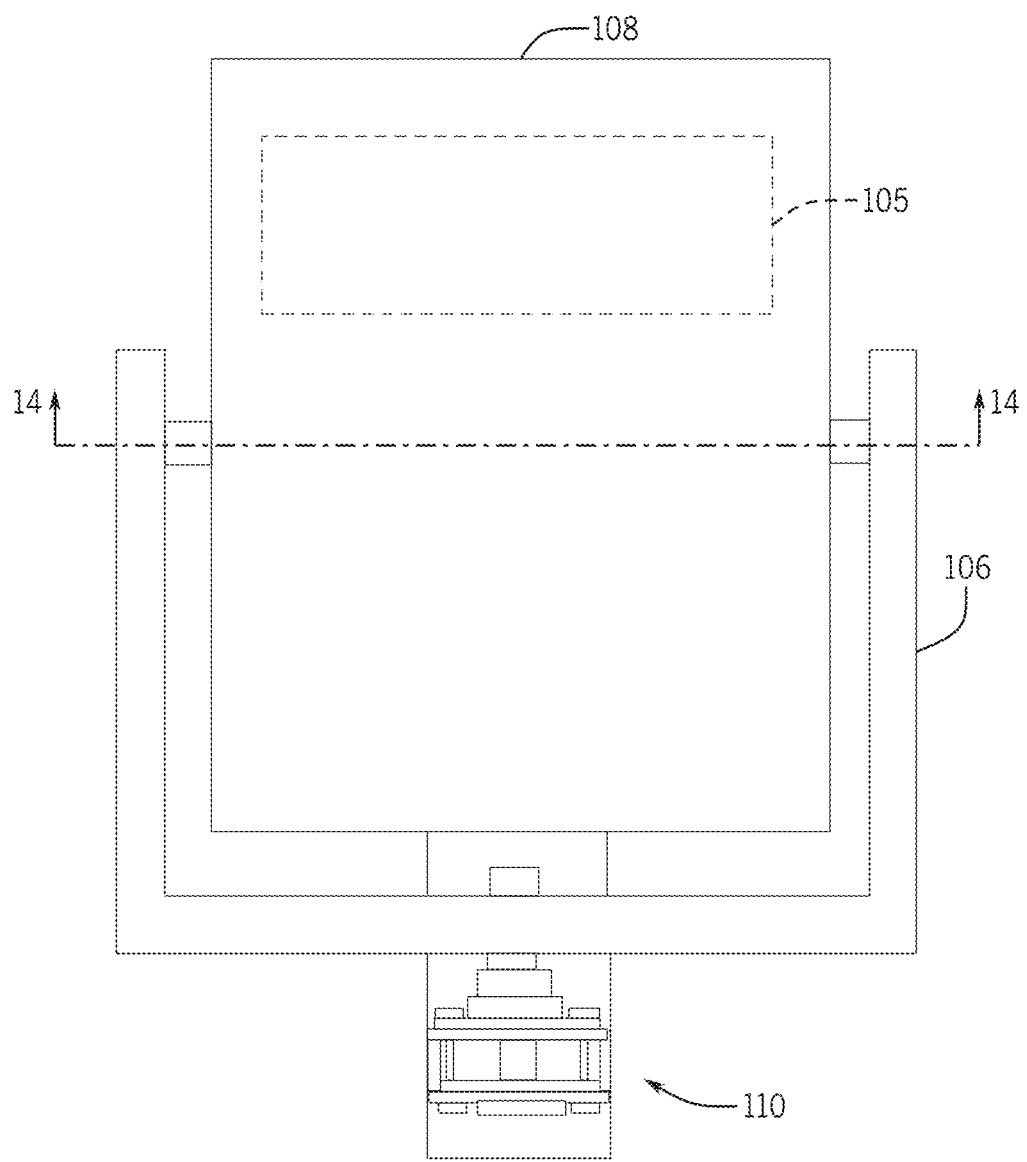
FIG. 13 illustrates a top view of an example gimbaled container.

A container for use as a gimbaled container may vary in form and structure from the exemplary container 108 described above without departing from the scope of the disclosure. For example, containers may be made from panels without a frame. As described above, containers may take various shapes depending on the load of the container. Further, in some implementations, containers may include interior dividers to form sub-compartments for different types of foods, beverages, or other loads. For example, a container may include a separate compartment for beverages accessible by a different door than the main compartment of the container. A container 108 may also include a viewport 105 (shown in broken lines in FIG. 13), which may be used to view contents placed in the internal chamber of the container 108.

As described above, the container 108 may be mounted to the support 102 by the mounting structures 314 connecting the container 108 to the movable support 106. With respect to FIG. 17, in some implementations, the container 108 may be mounted to the movable support 106 with rotatable assemblies in the arms 178 and 180 such that an axle fixed with respect to the container 108 (e.g., welded to or press fit in mounting plates 370 and 374) is rotatably supported by bearings and/or dampers in the arms 178 and 180 and rotates within the arms 178 and 180. Other connections between the support 102 and the container 108 may be possible. For example, in one implementation, springs or linear dampers may connect the container 108 to the base 112 of the support 102 to further stabilize the container 108.

Figure 18:
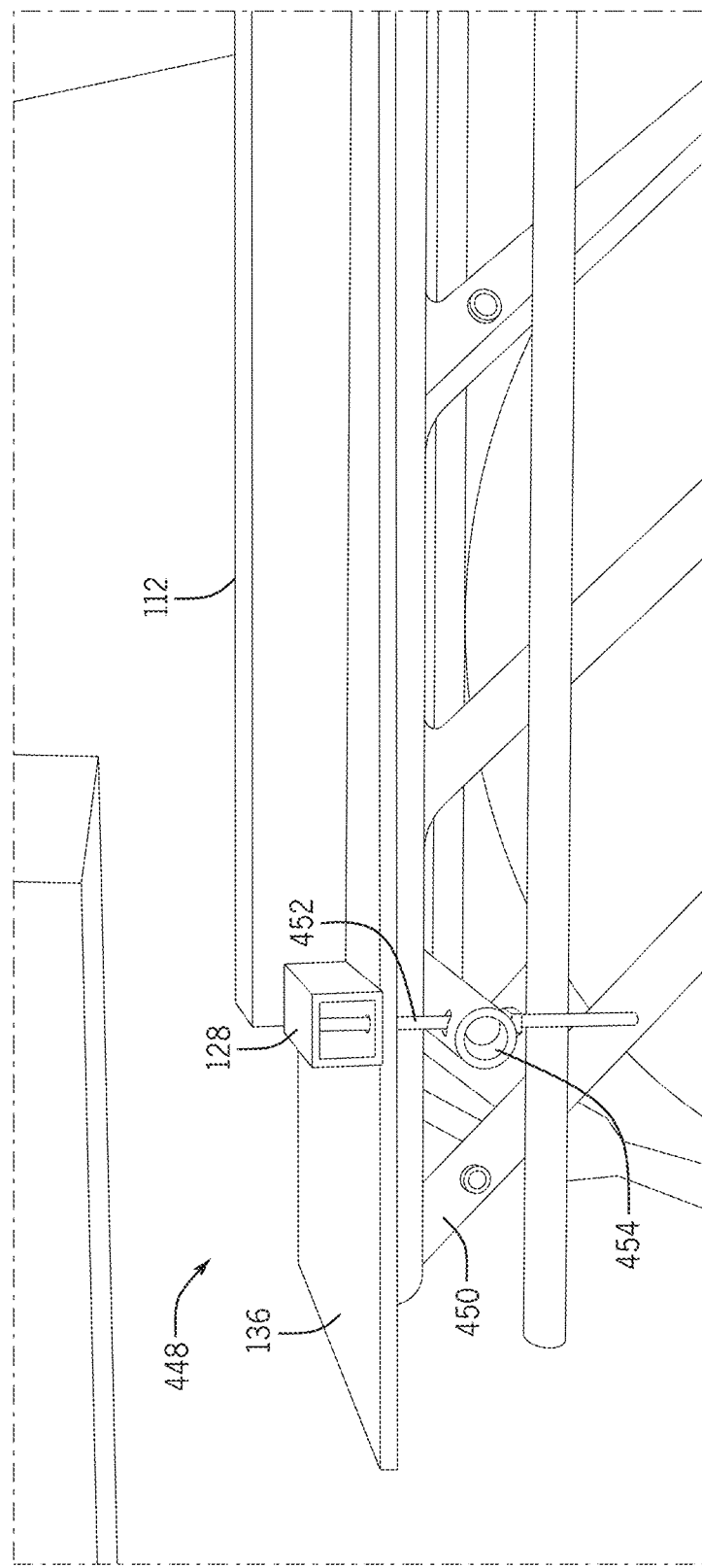
FIG. 18 illustrates a connection assembly for connecting a gimbaled container to a bicycle.

With reference to FIG. 18, in some implementations, the gimbaled container 100 may be mounted to a vehicle such as a bicycle, motorcycle, snowmobile, or other vehicle including a rack 450. The gimbaled container 100 may include, for example, a vehicle mounting assembly 448 configured to either removably or permanently secure the gimbaled container 100 to a vehicle. For example, a vehicle mounting assembly 448 may include clips connected to the base 112 of the fixed support 104 sized to secure the base 112 to an existing luggage or cargo rack. In other implementations, the vehicle mounting assembly 448 may include fasteners, such as screws or bolts connected to the base 112 to fasten the base 112 directly into a portion of the vehicle, such as a luggage rack.

The vehicle mounting assembly 448 shown in FIG. 18 includes anchor bars (e.g., anchor bar 128) welded to the base 112 of the fixed support 104 and a mounting board 136 located between the base 112 of the gimbaled container 100 and a cargo rack 450 of a bicycle. In some implementations, the mounting board 136 may include a protective layer, such as foam, rubber, or neoprene on the face contacting the cargo rack 450 to avoid damage to the cargo rack. As shown, the anchor bar 128 may include an opening perpendicular or substantially perpendicular to the mounting board 136. A fastener 452 (e.g., a screw or bolt), may extend through the opening of the anchor bar 128 and through a corresponding opening in a mounting rod 454 located under at least a first plane of the cargo rack 450. The base 112 may include additional anchor bars to hold the gimbaled container 100 in place with respect to the cargo rack 450. For example, an anchor bar collinear with the anchor bar 128 welded to an opposing face of the base 112 may be secured to the opposing end of the mounting rod 454 such that the cargo rack 450 is retained between the mounting rod 454 and the mounting board 136.

Other methods of mounting the gimbaled container 100 may utilize, for example, clamps designed to lock with anchors (e.g., child seat anchors) within a vehicle. For example, a clamp may be U-shaped or may have two arms which interlock with anchors (e.g., metal rings or loops) within a vehicle.

Turning now to FIGS. 19A and 19B, the gimbaled container 100 allows the container 108 to rotate about a first axis and a second axis relative to the fixed support 104. FIG. 19A shows rotation of the fixed support 104 responsive to motion about the first axis, such as a sharp turn when mounted to a bicycle (arrow 460 showing the tilt of the bicycle). Without the ability to rotate relative to the support 102, the contents of the container 108 would be subjected to the forces of the turn and would tilt along the axis, possibly spilling or shifting the contents of the container 108. With the connecting assembly 110 allowing the container 108 to rotate relative to the fixed support 104 along the axis 5, the fixed support 104 may rotate with the vehicle while the container 108 maintains its neutral or upright positon. Accordingly, the container 108 is able to maintain its position without causing spillage of the contents of the container 108 (e.g., load 462 shown in FIG. 19B).

With reference to FIG. 19B, the gimbaled container 100 may also be subjected to rotation about a second axis 7. For example, a bicycle traveling downhill may cause rotation of the container 108 about the second axis 7. Without the ability to rotate respective to the support 102, the container 108 may be tilted at an angle of a hill during descent, which may cause spillage or shifting of contents of the container 108. The mounting assemblies 314 allow the container 108 to rotate about the second axis 7 with respect to the support 102 such that the container 108 can maintain a neutral or upright position relative to the support 102, reducing motion transferred to the contents 462 of the container 108.

Figure 20:
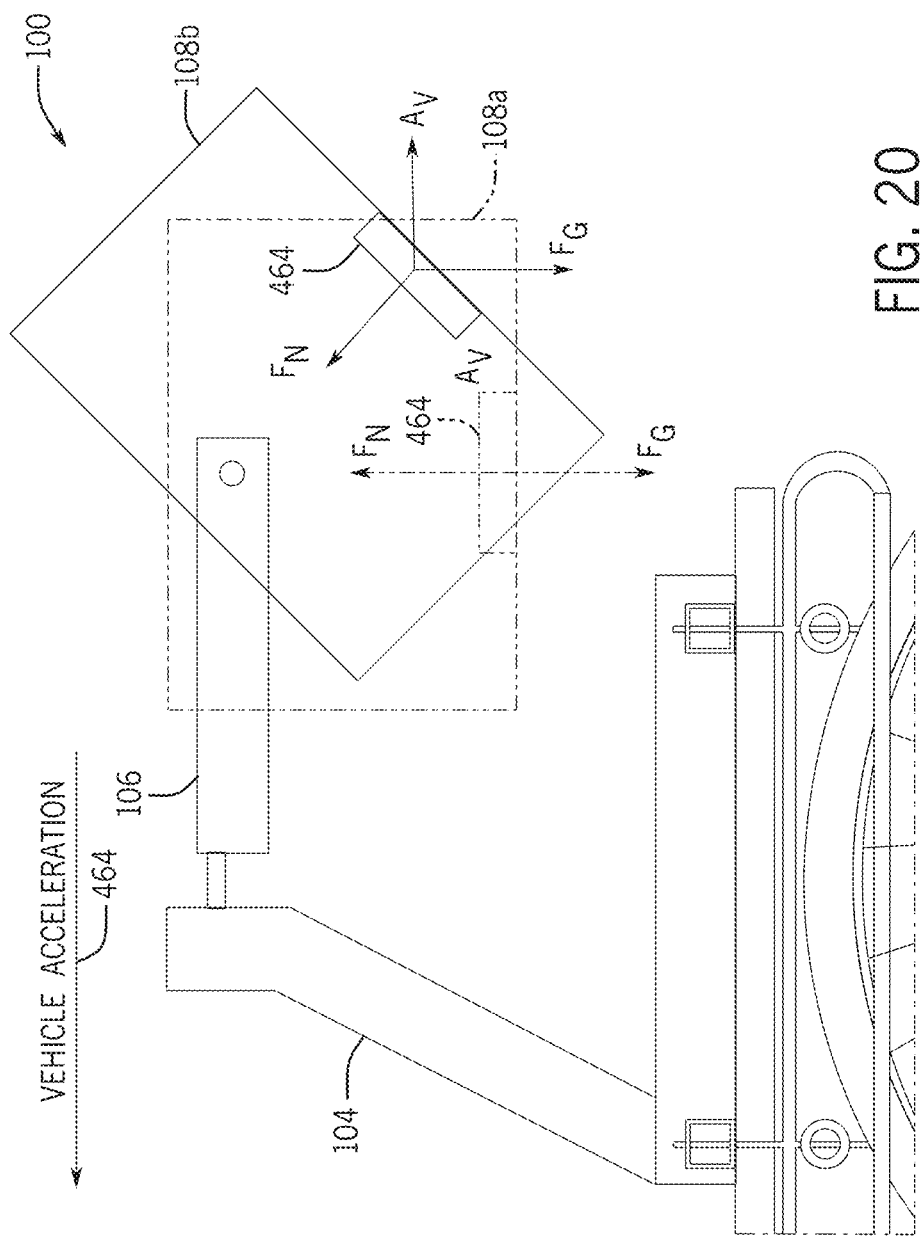
FIG. 20 illustrates an example gimbaled container responsive to a change in momentum.

With reference to FIG. 20, the gimbaled container 100 may also rotate responsive to momentum changes (e.g., linear or rotational acceleration) introduced to the container 108 by movement of the vehicle. For example, the vehicle of FIG. 20 may be accelerating on a flat surface in a direction indicated by arrow 464. Container 108a shows the container 108 before the vehicle begins accelerating. As the contents 462 of the container 108a are not subject to acceleration due to the vehicle, the contents 464 remain in place. Container 108b shows the container 108 as the vehicle is accelerating. To offset the acceleration introduced to the contents 464 of the container 108, the container 108 rotates about the second axis 7. The rotation shifts the angular direction of the normal force ($F_N$) exerted on the contents 464 by the bottom surface of the container 108 such that a component of the normal force opposes the acceleration ($a_v$) and a resultant force perpendicular to the bottom surface of the container 108 directed towards the bottom surface of the container 108 remains to keep the contents 464 of the container 108 in place with respect to the container 108.

The container 108 may similarly rotate about the first axis 5 or about both the first axis 5 and the second axis 7 responsive to changes in momentum of the vehicle, which may be changes in either angular or linear momentum. Accordingly, the contents 464 of the container are kept in place within the container 108 by a downward resultant force normal to the bottom surface of the container 108 while the vehicle is accelerating or decelerating. When the vehicle is no longer accelerating or decelerating (reaches a constant speed), the container 108 returns to an upright position and maintains the upright position responsive to tilt of the vehicle, as described with respect to FIGS. 19A and 19B.

Where the connecting assembly 110 and one or more of the mounting assemblies 314 include rotational dampers, periodic sway introduced to the container 108 as a result of rotational inertia can be opposed, such that back and forth swing of the container 108 is of a lesser magnitude than without rotational dampers. For example, one or more dampers (e.g., rotational damper 418) may resist rotation of the container 108 relative to the support 102 about the second axis 7. For example, when the gimbaled container 100 is mounted to a bicycle that stops suddenly, as shown in FIG. 20, rotational inertia is introduced into the system, causing the container 108 to sway back and forth about the second axis 7 once the bicycle has stopped. When the vehicle stops abruptly and without rotational dampers, the container 108 rotates freely and may continue swaying back and forth with large enough angular velocity and rotational displacement to cause undesired effects for the operator of the vehicle. The rotational damper 418 may resist the rotation of the container 108 about the axis 7 to slow and eventually stop sway of the container 108 in a manner that reduces the amplitude of swing or rotational displacement and reduces the angular velocity of the container 108 during any swinging motion. For example, when the bicycle initially stops, the container 108 may swing quickly to a first angled position to compensate for the momentum change, with a steep angle between the container 108 and the upright or neutral position of the container 108. Due to the rotational damper 418 opposing the rotation of the container about the axis 7, the angle between the container 108 and the upright or neutral position may reduce over time until the container 108 returns to the neutral position. Further, the rotational dampers 418 may smooth out and slow down rotational motion of the container 108, mitigating any forces transmitted to the vehicle as a result of the swinging of the container 108. In various situations, sudden motion of a vehicle may cause motion about the first axis 5 and the second axis 7 at the same time. Accordingly, the rotational damper 232 and the rotational damper 418 may resist rotation of the container 108 at the same time.

Figure 22:
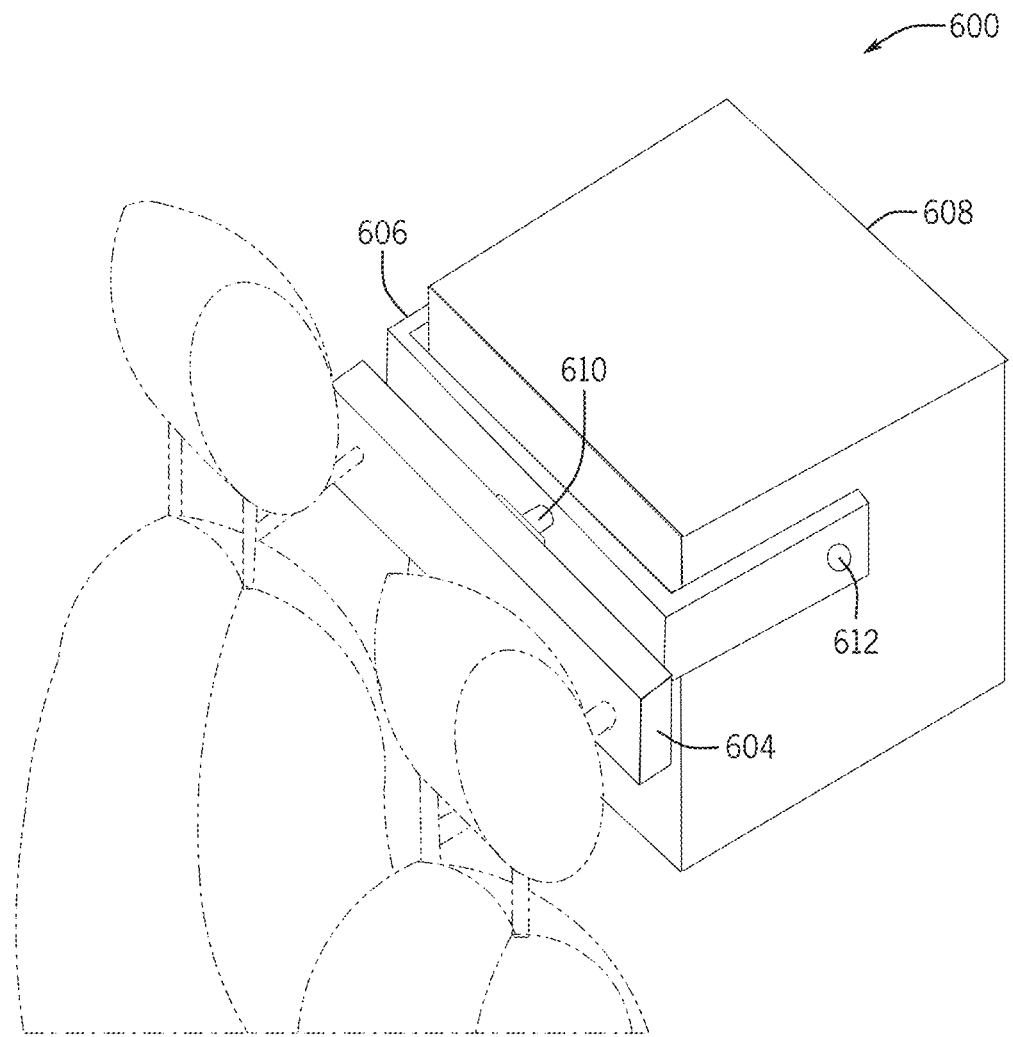
FIG. 22 illustrates an example gimbaled container.

Other implementations of gimbaled containers may provide similar function. For example, the gimbaled container 600 shown in FIG. 22 and the gimbaled container 700 shown in FIG. 23 each vary from the gimbaled container 100 while allowing motion about two axes to protect the contents of the containers 608 and 708, respectively. With reference to FIG. 22, the gimbaled container 600 includes a fixed support 604 that may be attached to various vehicles including, as shown in broken lines, to headrests of a car using brackets or other mounting hardware. A connecting assembly 610 connects a movable support 606 to the fixed support 604, where the movable support 606 is substantially U-shaped. The connecting assembly 610 may include any components described above with respect to the connecting assembly 110 of the gimbaled container 100. Mounting assemblies 612 mount the container 608 to the movable support 606. The mounting assemblies 612 may include any components described with respect to the mounting assemblies 314 of the gimbaled container 100. Accordingly, the container 608 may rotate about a first axis 8 and a second axis 9 relative to the fixed support 604 responsive to changes in orientation and momentum of the vehicle.

Figure 23:
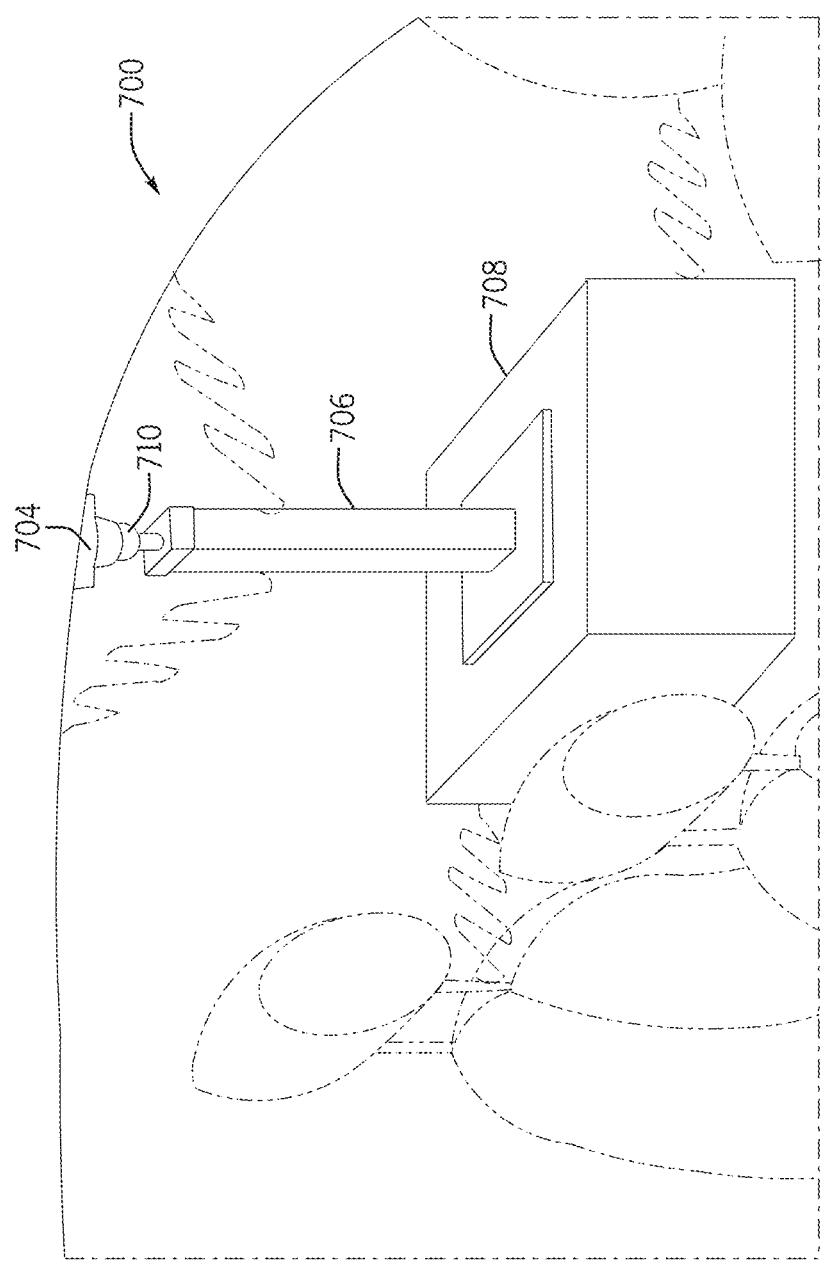
FIG. 23 illustrates an example gimbaled container.

With reference to FIG. 23, the gimbaled container 700 includes a fixed support 704 that may be mounted to the roof of a vehicle, as shown in FIG. 23. The fixed support 704 may also, in various implementations be mounted to a trailer or other component of a vehicle. A movable support 706 is an elongated member portion connected to the fixed support by a connecting assembly 710. The connecting assembly 710 is implemented by a ball joint, which allows the container 708 fixedly connected to the movable support 706 to rotate in numerous directions to adjust for changes in orientation and momentum of the vehicle. In some implementations, the gimbaled container 700 may include external damping mechanisms, shown in broken lines as springs in FIG. 23. Springs may be implemented by, for example, constant force springs or elastomers behaving as springs. In other implementations, the gimbaled container 700 may be implemented without damping mechanisms or with other types of damping mechanisms, such as frictional engagement between the ball and socket of the connecting assembly 710.

Figure 24A:
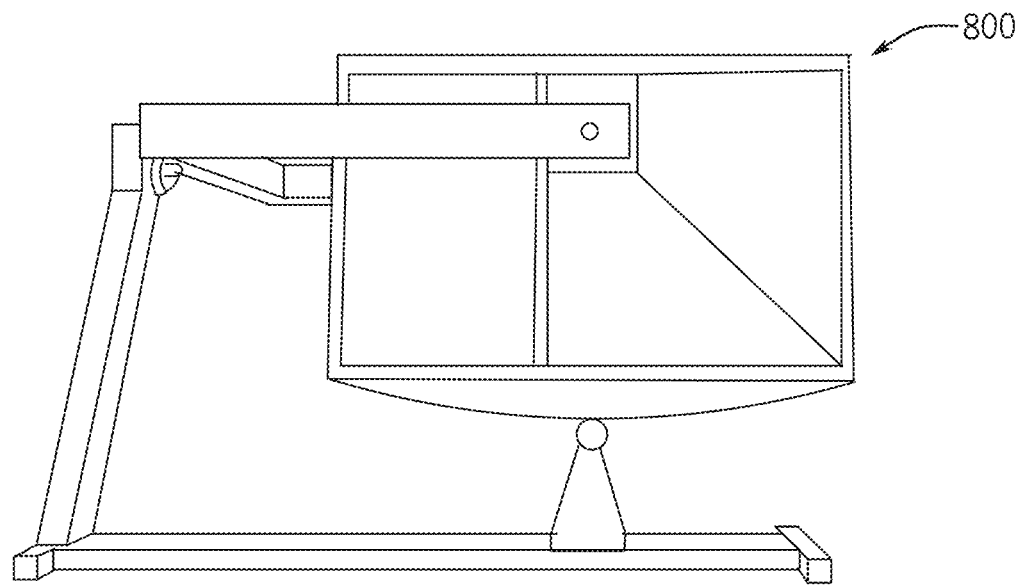
FIG. 24A illustrates an example gimbaled container.
Figure 24B:
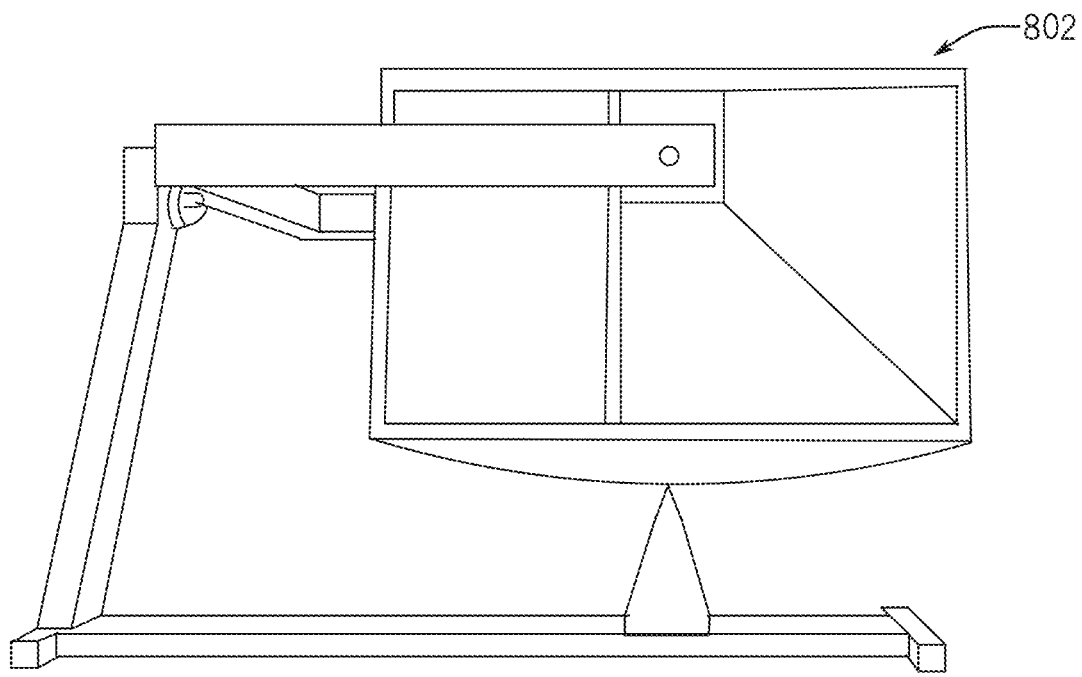
FIG. 24B illustrates an example gimbaled container.

FIG. 24A illustrates an example gimbaled container 800. FIG. 24B illustrates an example gimbaled container 802. As shown in FIGS. 24A and 24B, one may curve the bottom of the content box (e.g., container or housing) to provide a surface to roll on a bearing placed directly underneath the box. This will enable the bearing to support a portion of the load yet not significantly reduce the rotational dynamics of the multi-axis gimbaled container. The multi-axis gimbaled container will still rotate and stabilize the contents of the container with a weight supporting bearing on the bottom of the container and with only a minor reduction in rotational forces induced from the weight support of the bearing reducing the weight of the container that is suspended. It reduces load on the suspension bracket for the box and improves construction. The bearing could be a slippery surface, a rolling caster, a rotating ball that could be on its own bearings or a like a ball point pen, or any number of other bearing types that have 360 degree rotation both rotationally and directionally.

Figure 25B:
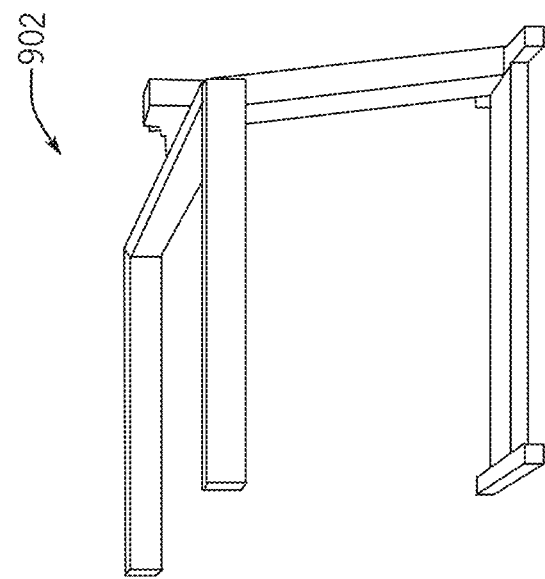
FIG. 25B illustrates an example housing of a gimbaled container.
Figure 25A:
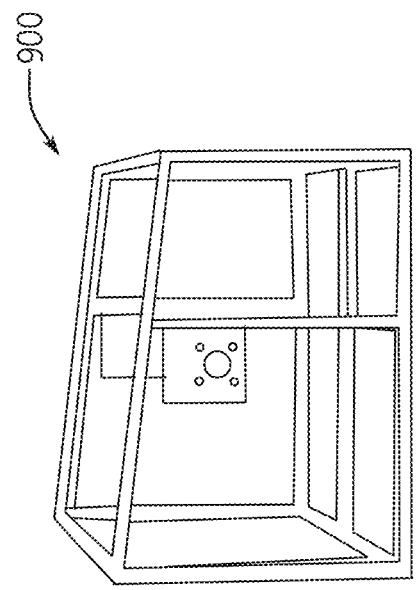
FIG. 25A illustrates an example support for a gimbaled container.

FIG. 25A illustrates an example support 900 for a gimbaled container. FIG. 25B illustrates an example housing 902 of a gimbaled container 902. The example housing 902 is shaped to allow for easier storage of items within the housing 902.

The above specification, examples and data provide a complete description of the structure and use of exemplary embodiments of the invention as defined in the claims. Although various embodiments of the claimed invention have been described above with a certain degree of particularity, or with reference to one or more individual embodiments, it is appreciated that numerous alterations to the disclosed embodiments without departing from the spirit or scope of the claimed invention may be possible. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A container assembly comprising:
   a container rotatably connected to a support structure to rotate relative to the support structure about a first axis by a mounting assembly, the mounting assembly comprising a first rotational damper that resists rotational motion of the container about the first axis; and
   a connecting assembly operably rotatably connected between the container and the support structure about a second axis, the connecting assembly comprising a second rotational damper to resist rotational motion of the container relative to the support structure about the second axis, wherein:
   a center of mass of the container is located below at least a portion of the first axis and the second axis; and
   the first rotational damper and the second rotational damper comprise at least one of a viscous dampener, a press fit bushing, or a disc brake.

2. The container assembly of claim 1, wherein the mounting assembly and the connecting assembly allow the container to maintain a neutral position responsive to changes in orientation of the support structure, wherein the mounting assembly and the connecting assembly further allow the container to rotate responsive to changes in momentum on the gimbaled container.

3. The container assembly of claim 1, wherein the container is enclosed and the contents of the container are accessible by one or more doors.

4. The container assembly of claim 1, wherein the connecting assembly is at least partially positioned within the container.

5. The container assembly of claim 1, wherein:
   the container assembly is fixedly coupled to a vehicle, and
   the location of the center of mass below the first axis and the second axis causes the container to rotate about at least one of the first axis or the second axis responsive to a change in momentum of the vehicle.

6. The container assembly of claim 1, wherein the vehicle comprises a two-wheeled vehicle, a three wheeled vehicle, or a four-wheeled vehicle.

7. The container assembly of claim 1, wherein the support structure comprises a movable support rotatably mounted to the container by the mounting assembly and rotatably mounted to a fixed support by the connecting assembly.

8. The container assembly of claim 7, wherein the connecting assembly dampens rotational motion of the container and the movable support relative to the fixed assembly.

9. The container assembly of claim 1, wherein the location of the center of mass below the first axis and the second axis causes the container to rotate about at least one of the first axis or the second axis responsive to a change in momentum of the container assembly.

10. The container assembly of claim 9, wherein the container includes a surface adapted to receive a food item.

11. The container assembly of claim 10, wherein the rotation about at least one of the first axis or the second axis causes the surface to move to resist spillage of the food item.

12. A gimbal assembly comprising:
   a gimbal frame mounted on a vehicle, the gimbal frame comprising:
   a fixed support comprising:
      a base portion attachable to a vehicle; and
      an angled portion comprising a first end attached to the base portion and a second end suspended above the base portion;
   a movable support rotatably mounted to a second end of the angled portion and rotatable about a first axis of rotation; and
   a container defining an internal chamber mounted to the gimbal frame, the container rotatable about the first axis of rotation and a second axis of rotation; wherein the container defines a neutral orientation when the vehicle is not motionless, and the gimbal frame movably supports the container to substantially maintain the neutral orientation responsive to changes in an orientation of the vehicle, and the gimbal frame movable to support the container to rotate responsive to changes in momentum of the vehicle to maintain a position of contents of the container within the container.

13. The gimbal assembly of claim 12, wherein the angled portion is angled towards a rear of the vehicle and away from a user.

14. The gimbal assembly of claim 12, wherein the movable support extends laterally from the rotatable mount with the fixed support.

15. The gimbal assembly of claim 12, wherein the vehicle comprises at least one of a bicycle, a motorcycle, a scooter, or a moped.

16. The gimbal assembly of claim 12, further comprising:
a damper structure, wherein the damper structure engages the movable support and limits movement of the movable support relative to the fixed support.

17. The gimbal assembly of claim 12, wherein the movable support defines opposing arms that each rearwardly extend from the fixed support at locations on opposite sides of the rotatable mount.

18. The gimbal assembly of claim 17, wherein the container rotatably mounts between the opposing arms of the movable support.

19. A container assembly comprising:
a housing defining an enclosure;
a support structure mountable to a vehicle via an attachment plate, the support structure comprising stabilizing bars to engage the attachment plate;
a mounting assembly coupled to the housing and configured to movably couple the housing to the support structure, wherein the mounting assembly allows rotation about a first axis; and
a connecting assembly coupled to the housing and the support structure, wherein the connecting assembly allows rotation about a second axis.

20. The container assembly of claim 19, wherein the mounting assembly includes a rotational damper configured to resist rotation of the housing about the first axis.

21. The container assembly of claim 19, wherein the connecting assembly includes a rotational damper configured to resist rotation of the housing about the second axis.

22. The container assembly of claim 19, wherein the support structure includes a fixed portion and a movable portion, wherein the connecting assembly rotatably connects the movable portion of the support structure to the fixed portion of the support structure.

23. The container assembly of claim 22, wherein the mounting assembly connects the housing to the movable portion of the support structure.

24. A food delivery system comprising:
a vehicle including an automobile;
a support structure attached to at least one of a seat structure of the vehicle or a roof of the vehicle;
a container adapted to receive a food item and rotatably connected to the support structure to rotate relative to the support structure about a first axis by a mounting assembly, wherein the support structure is coupled to the vehicle;
a connecting assembly operably rotatably connected between the container and the mounting assembly about a second axis, wherein the container rotates about at least one of the first axis or the second axis responsive to a change in momentum of the vehicle to resist spillage of the food item.

* * * * *